US009810439B2

(12) United States Patent
Coutu et al.

(10) Patent No.: US 9,810,439 B2
(45) Date of Patent: Nov. 7, 2017

(54) ENERGY EXCHANGE SYSTEM FOR CONDITIONING AIR IN AN ENCLOSED STRUCTURE

(75) Inventors: Ken Coutu, Saskatoon (CA); Howard Brian Hemingson, Saskatoon (CA); Manfred Gerber, Saskatoon (CA)

(73) Assignee: Nortek Air Solutions Canada, Inc., Saskatoon (CA)

(*) Notice: Subject to any disclaimer, the term of this patent is extended or adjusted under 35 U.S.C. 154(b) by 1216 days.

(21) Appl. No.: 13/449,598

(22) Filed: Apr. 18, 2012

(65) Prior Publication Data

US 2013/0056177 A1    Mar. 7, 2013

Related U.S. Application Data

(60) Provisional application No. 61/530,810, filed on Sep. 2, 2011, provisional application No. 61/584,617, filed on Jan. 9, 2012.

(51) Int. Cl.
*F25B 29/00* (2006.01)
*F24F 3/14* (2006.01)
(Continued)

(52) U.S. Cl.
CPC ............ *F24F 3/1417* (2013.01); *F24F 3/147* (2013.01); *F24F 12/002* (2013.01);
(Continued)

(58) Field of Classification Search
CPC ..... F28D 19/042; F24F 12/002; F24F 11/008; F24F 3/1417; F24F 12/001
(Continued)

(56) References Cited

U.S. PATENT DOCUMENTS 1,015,831 A    1/1912 Pielock et al.
2,186,844 A    1/1940 Smith
(Continued)

FOREIGN PATENT DOCUMENTS

AU    2011286700 A1    12/2012
CA    2283089 A1    11/2000
(Continued)

OTHER PUBLICATIONS

"Desiccant Enhanced Evaporative Air Conditioning: Parametric Analysis and Design," J. Woods and E. Kozunal, Presented at the Second International Conference on Building Energy and Environment (COBEE2012), Conference Paper, Oct. 2012.
(Continued)

*Primary Examiner* — Travis Ruby
(74) *Attorney, Agent, or Firm* — Schwegman Lundberg & Woessner, P.A.

(57) ABSTRACT

Certain Embodiments provide an energy exchange system that includes a supply air flow path, an exhaust air flow path, an energy recovery device disposed within the supply and exhaust air flow paths, and a supply conditioning unit disposed within the supply air flow path. The supply conditioning unit may be downstream from the energy recovery device. Certain embodiments provide a method of conditioning air including introducing outside air as supply air into a supply air flow path, pre-conditioning the supply air with an energy recovery device, and fully-conditioning the supply air with a supply conditioning unit that is downstream from the energy recovery device.

63 Claims, 12 Drawing Sheets

(51) Int. Cl.
  *F28D 19/04* (2006.01)
  *F28D 21/00* (2006.01)
  *F24F 12/00* (2006.01)
  *F24F 3/147* (2006.01)

(52) U.S. Cl.
  CPC ....... *F28D 19/042* (2013.01); *F28D 21/0015* (2013.01); *F24F 2003/1435* (2013.01); *Y02B 30/52* (2013.01); *Y02B 30/563* (2013.01)

(58) Field of Classification Search
  USPC ................. 165/7, 9.3, 96, 203, 301, 233
  See application file for complete search history.

(56) References Cited

U.S. PATENT DOCUMENTS

| | | |
|---|---|---|
| 2,290,465 A | 7/1942 | Crawford et al. |
| 2,562,811 A | 7/1951 | Muffly |
| 2,946,201 A | 7/1960 | Munters |
| 2,968,165 A | 1/1961 | Norback |
| 3,009,684 A | 11/1961 | Munters |
| 3,018,231 A | 1/1962 | Valentine et al. |
| 3,247,679 A | 4/1966 | Meckler |
| 3,291,206 A | 12/1966 | Peter |
| 3,401,530 A | 9/1968 | Meckler |
| 3,467,072 A | 9/1969 | Toesca |
| 3,735,559 A | 5/1973 | Salemme |
| 4,113,004 A | 9/1978 | Rush et al. |
| 4,180,985 A | 1/1980 | Northrup, Jr. |
| 4,233,796 A | 11/1980 | Mazzoni et al. |
| 4,235,081 A | 11/1980 | Dowling |
| 4,474,021 A | 10/1984 | Harband |
| 4,538,426 A | 9/1985 | Bock |
| 4,594,860 A | 6/1986 | Coellner et al. |
| 4,719,761 A | 1/1988 | Cromer |
| 4,729,428 A | 3/1988 | Yasutake et al. |
| 4,841,733 A | 6/1989 | Dussault et al. |
| 4,887,438 A | 12/1989 | Meckler |
| 4,905,479 A | 3/1990 | Wilkinson |
| 4,909,810 A | 3/1990 | Nakao et al. |
| 4,936,107 A | 6/1990 | Kitagaki et al. |
| 4,939,906 A | 7/1990 | Spatz et al. |
| 4,941,324 A | 7/1990 | Peterson |
| 4,982,575 A | 1/1991 | Besik |
| 5,003,961 A | 4/1991 | Besik |
| 5,020,334 A | 6/1991 | Wilkinson |
| 5,022,241 A | 6/1991 | Wilkinson |
| 5,120,445 A | 6/1992 | Colman |
| 5,148,374 A | 9/1992 | Coellner |
| 5,170,633 A | 12/1992 | Kaplan |
| 5,176,005 A | 1/1993 | Kaplan |
| 5,181,387 A | 1/1993 | Meckler |
| 5,191,771 A | 3/1993 | Meckler |
| 5,297,398 A | 3/1994 | Meckler |
| 5,311,929 A | 5/1994 | Verret |
| 5,325,676 A | 7/1994 | Meckler |
| 5,351,497 A | 10/1994 | Lowenstein |
| 5,353,606 A | 10/1994 | Yoho et al. |
| 5,373,704 A | 12/1994 | McFadden |
| 5,387,376 A | 2/1995 | Gasser |
| 5,448,895 A | 9/1995 | Coellner et al. |
| 5,471,852 A | 12/1995 | Meckler |
| 5,482,625 A | 1/1996 | Shimizu et al. |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,542,968 A | 8/1996 | Belding |
| 5,551,245 A | 9/1996 | Calton et al. |
| 5,564,281 A | 10/1996 | Calton et al. |
| 5,579,647 A | 12/1996 | Calton et al. |
| 5,580,369 A | 12/1996 | Belding |
| 5,632,954 A | 5/1997 | Coellner et al. |
| 5,638,900 A | 6/1997 | Lowenstein |
| 5,649,428 A | 7/1997 | Calton et al. |
| 5,650,221 A | 7/1997 | Belding |
| 5,660,048 A | 8/1997 | Belding |
| 5,685,897 A | 11/1997 | Belding |
| 5,701,762 A | 12/1997 | Akamatsu et al. |
| 5,718,286 A | 2/1998 | Damsohn et al. |
| 5,727,394 A | 3/1998 | Belding |
| 5,749,230 A | 5/1998 | Coellner et al. |
| 5,758,508 A | 6/1998 | Belding |
| 5,758,511 A | 6/1998 | Yoho et al. |
| 5,761,915 A | 6/1998 | Rao |
| 5,761,923 A | 6/1998 | Maeda |
| 5,791,153 A | 8/1998 | Belding |
| 5,791,157 A | 8/1998 | Maeda |
| 5,816,065 A | 10/1998 | Macda |
| 5,825,641 A | 10/1998 | Mangtani |
| 5,826,434 A | 10/1998 | Belding |
| 5,832,736 A | 11/1998 | Yoshioka et al. |
| 5,860,284 A | 1/1999 | Goland |
| 5,890,372 A | 4/1999 | Belding |
| 5,911,273 A | 6/1999 | Brenner et al. |
| 5,931,016 A | 8/1999 | Yoho, Sr. |
| 5,943,874 A | 8/1999 | Macda |
| 5,946,931 A | 9/1999 | Lomax et al. |
| 5,992,160 A | 11/1999 | Bussjager et al. |
| 6,003,327 A | 12/1999 | Belding |
| 6,018,953 A | 2/2000 | Belding |
| 6,029,462 A | 2/2000 | Denniston |
| 6,029,467 A | 2/2000 | Moratalla |
| 6,050,100 A | 4/2000 | Belding |
| 6,079,481 A | 6/2000 | Lowenstein |
| 6,094,835 A | 8/2000 | Cromer |
| 6,138,470 A | 10/2000 | Potnis et al. |
| 6,141,979 A | 11/2000 | Dunlap |
| 6,145,588 A | 11/2000 | Martin et al. |
| 6,176,101 B1 | 1/2001 | Lowenstein |
| 6,178,762 B1 | 1/2001 | Flax |
| 6,199,388 B1 | 3/2001 | Fischer, Jr. |
| 6,237,354 B1 | 5/2001 | Cromer |
| 6,269,650 B1 | 8/2001 | Shaw |
| 6,318,106 B1 | 11/2001 | Maeda |
| RE37,464 E | 12/2001 | Meckler |
| 6,363,218 B1 | 3/2002 | Lowenstein |
| 6,412,295 B2 | 7/2002 | Weiss et al. |
| 6,442,951 B1 | 9/2002 | Maeda et al. |
| 6,494,053 B1 | 12/2002 | Forkosh |
| 6,497,107 B2 | 12/2002 | Maisotsenko et al. |
| 6,532,763 B1 | 3/2003 | Gupte |
| 6,546,746 B2 | 4/2003 | Forkosh et al. |
| 6,568,466 B2 | 5/2003 | Lowenstein |
| 6,575,228 B1 | 6/2003 | Ragland et al. |
| 6,598,862 B2 | 7/2003 | Merrill et al. |
| 6,635,104 B2 | 10/2003 | Komkova et al. |
| 6,644,059 B2 | 11/2003 | Maeda et al. |
| 6,684,649 B1 | 2/2004 | Thompson |
| 6,709,492 B1 | 3/2004 | Spadaccini et al. |
| 6,720,990 B1 | 4/2004 | Walker et al. |
| 6,739,142 B2 | 5/2004 | Korin |
| 6,745,826 B2 | 6/2004 | Lowenstein |
| 6,751,964 B2 | 6/2004 | Fischer |
| 6,841,601 B2 | 1/2005 | Serpico et al. |
| 6,848,265 B2 | 2/2005 | Lowenstein |
| 6,854,278 B2 | 2/2005 | Maisotsenko et al. |
| 6,864,005 B2 | 3/2005 | Mossman |
| 6,935,416 B1 | 8/2005 | Tsunoda et al. |
| 6,973,795 B1 | 12/2005 | Moffitt |
| 6,976,365 B2 | 12/2005 | Forkosh et al. |
| 6,978,633 B2 | 12/2005 | Yamazaki |
| 7,000,427 B2 | 2/2006 | Mathias et al. |
| 7,017,356 B2 | 3/2006 | Moffitt |
| 7,092,006 B2 | 8/2006 | Walker et al. |
| 7,093,452 B2 | 8/2006 | Chee et al. |
| 7,093,649 B2 | 8/2006 | Dawson |
| RE39,288 E | 9/2006 | Assaf |
| 7,178,355 B2 | 2/2007 | Moffitt |
| 7,181,918 B2 | 2/2007 | Reinders et al. |
| 7,269,966 B2 | 9/2007 | Lowenstein |
| 7,306,650 B2 | 12/2007 | Slayzak |
| 7,331,376 B2 | 2/2008 | Gagnon et al. |
| 7,340,906 B2 | 3/2008 | Moffitt |

(56) References Cited

U.S. PATENT DOCUMENTS

| | | |
|---|---|---|
| 7,389,646 B2 | 6/2008 | Moffitt |
| 7,389,652 B1 | 6/2008 | Fair |
| 7,593,033 B2 | 9/2009 | Walker et al. |
| 7,602,414 B2 | 10/2009 | Walker et al. |
| 7,605,840 B2 | 10/2009 | Walker et al. |
| 7,717,404 B2 | 5/2010 | Hasegawa et al. |
| 7,719,565 B2 | 5/2010 | Walker et al. |
| 7,737,224 B2 | 6/2010 | Willis et al. |
| 7,753,991 B2 | 7/2010 | Kertzman |
| 7,781,034 B2 | 8/2010 | Yializis et al. |
| 7,817,182 B2 | 10/2010 | Walker et al. |
| 7,942,387 B2 | 5/2011 | Forkosh |
| 7,966,841 B2 | 6/2011 | Lowenstein |
| 8,002,023 B2 | 8/2011 | Murayama |
| 8,033,532 B2 | 10/2011 | Yabu |
| 8,137,436 B2 | 3/2012 | Calis et al. |
| 8,157,891 B2 | 4/2012 | Montie et al. |
| 8,318,824 B2 | 11/2012 | Matsuoka et al. |
| 8,550,151 B2 | 10/2013 | Murayama et al. |
| 8,769,971 B2 | 7/2014 | Kozubal et al. |
| 8,783,053 B2 | 7/2014 | McCann |
| 8,887,523 B2 | 11/2014 | Gommed et al. |
| 8,920,699 B2 | 12/2014 | Marutani et al. |
| 8,943,848 B2* | 2/2015 | Phannavong et al. .......... 62/160 |
| 8,966,924 B2 | 3/2015 | Pichai |
| 9,027,764 B2 | 5/2015 | Marutani et al. |
| 9,109,808 B2 | 8/2015 | Gerber et al. |
| 9,188,349 B2 | 11/2015 | Warmerdam et al. |
| 9,234,665 B2 | 1/2016 | Erb et al. |
| 9,243,810 B2 | 1/2016 | Vandermeulen et al. |
| 9,273,877 B2 | 3/2016 | Vandermeulen et al. |
| 9,429,332 B2 | 8/2016 | Vandermeulen et al. |
| 2001/0003902 A1 | 6/2001 | Kopko |
| 2002/0038552 A1 | 4/2002 | Maisotsenko |
| 2003/0014983 A1 | 1/2003 | Maisotsenko et al. |
| 2003/0037905 A1 | 2/2003 | Weng |
| 2003/0070787 A1 | 4/2003 | Moffitt |
| 2004/0000152 A1 | 1/2004 | Fischer |
| 2004/0061245 A1 | 4/2004 | Maisotsenko et al. |
| 2004/0134212 A1 | 7/2004 | Lee |
| 2004/0168462 A1 | 9/2004 | Assaf |
| 2004/0226685 A1 | 11/2004 | Gagnon et al. |
| 2005/0056042 A1 | 3/2005 | Bourne et al. |
| 2005/0072303 A1 | 4/2005 | Weidenmann |
| 2005/0230080 A1 | 10/2005 | Paul et al. |
| 2005/0249901 A1 | 11/2005 | Yializis et al. |
| 2006/0021615 A1 | 2/2006 | Kertzman |
| 2006/0042295 A1 | 3/2006 | Assaf |
| 2006/0205301 A1 | 9/2006 | Klare et al. |
| 2007/0029685 A1 | 2/2007 | Lin |
| 2007/0056894 A1 | 3/2007 | Connors, Jr. |
| 2007/0234743 A1 | 10/2007 | Assaf |
| 2007/0279861 A1 | 12/2007 | Doll et al. |
| 2008/0023182 A1 | 1/2008 | Beamer et al. |
| 2008/0085437 A1 | 4/2008 | Dean et al. |
| 2008/0099184 A1 | 5/2008 | Han |
| 2008/0283217 A1 | 11/2008 | Gagnon et al. |
| 2009/0095162 A1* | 4/2009 | Hargis et al. .......... 96/245 |
| 2009/0126913 A1 | 5/2009 | Lee et al. |
| 2009/0133866 A1 | 5/2009 | Campbell et al. |
| 2009/0193974 A1 | 8/2009 | Montie et al. |
| 2009/0294110 A1 | 12/2009 | Foust |
| 2009/0324929 A1 | 12/2009 | Yamakawa et al. |
| 2010/0090356 A1 | 4/2010 | Sines et al. |
| 2010/0170776 A1 | 7/2010 | Ehrenberg et al. |
| 2010/0192605 A1 | 8/2010 | Fang et al. |
| 2010/0200068 A1* | 8/2010 | D'Arcy et al. .......... 137/1 |
| 2010/0275629 A1 | 11/2010 | Erickson |
| 2010/0300123 A1 | 12/2010 | Park et al. |
| 2010/0319370 A1 | 12/2010 | Kozubal |
| 2011/0056384 A1* | 3/2011 | Kadota .......... 96/407 |
| 2011/0192579 A1 | 8/2011 | Sotokawa et al. |
| 2011/0223486 A1 | 9/2011 | Zhang et al. |
| 2011/0232485 A1 | 9/2011 | Ellsworth |
| 2011/0232633 A1 | 9/2011 | Lima |
| 2011/0308265 A1 | 12/2011 | Phannavong |
| 2012/0061045 A1 | 3/2012 | Huizing |
| 2012/0085112 A1 | 4/2012 | Wintemute |
| 2012/0106073 A1 | 5/2012 | Wu et al. |
| 2012/0125020 A1 | 5/2012 | Vandermeulen |
| 2012/0125021 A1 | 5/2012 | Vandermeulen |
| 2012/0125023 A1 | 5/2012 | Kopko et al. |
| 2012/0125031 A1 | 5/2012 | Vandermeulen |
| 2012/0125405 A1 | 5/2012 | Vandermeulen |
| 2012/0125581 A1 | 5/2012 | Allen |
| 2012/0131934 A1 | 5/2012 | Vandermeulen |
| 2012/0131937 A1 | 5/2012 | Vandermeulen |
| 2012/0131938 A1 | 5/2012 | Vandermeulen |
| 2012/0131939 A1 | 5/2012 | Vandermeulen |
| 2012/0131940 A1 | 5/2012 | Vandermeulen |
| 2012/0132513 A1 | 5/2012 | Vandermeulen |
| 2012/0162918 A1 | 6/2012 | Thyni et al. |
| 2012/0168369 A1 | 7/2012 | Van Medevoort et al. |
| 2012/0186281 A1 | 7/2012 | Vandermeulen |
| 2012/0247132 A1 | 10/2012 | Lakdawala et al. |
| 2012/0298340 A1 | 11/2012 | Al-Otaibi |
| 2013/0186121 A1* | 7/2013 | Erb et al. .......... 62/238.1 |
| 2013/0199220 A1 | 8/2013 | Ma et al. |
| 2013/0240438 A1 | 9/2013 | Willis et al. |
| 2013/0248147 A1 | 9/2013 | Wintemute et al. |
| 2013/0340449 A1 | 12/2013 | Kozubal et al. |
| 2014/0054004 A1 | 2/2014 | LePoudre et al. |
| 2014/0054013 A1 | 2/2014 | Lepoudre et al. |
| 2014/0190037 A1 | 7/2014 | Erb et al. |
| 2014/0245769 A1 | 9/2014 | Vandermeulen et al. |
| 2014/0260367 A1 | 9/2014 | Coutu et al. |
| 2014/0260369 A1 | 9/2014 | Lepoudre et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0326433 A1 | 11/2014 | Kozubal |
| 2015/0096714 A1 | 4/2015 | Dagley |
| 2015/0184876 A1 | 7/2015 | Vandermeulen et al. |
| 2015/0292754 A1 | 10/2015 | Mongar |
| 2015/0323203 A1 | 11/2015 | Gerber et al. |
| 2016/0054012 A1 | 2/2016 | Lepoudre et al. |
| 2016/0084512 A1 | 3/2016 | Erb et al. |
| 2016/0187010 A1 | 6/2016 | Vandermeulen |
| 2016/0290666 A1 | 10/2016 | Coutu et al. |
| 2016/0327345 A1 | 11/2016 | Lowenstein |

FOREIGN PATENT DOCUMENTS

| | | |
|---|---|---|
| CA | 2798928 A1 | 2/2012 |
| CA | 2843763 A1 | 3/2013 |
| CA | 2904224 A1 | 9/2014 |
| CH | 193732 A | 10/1937 |
| CN | 1163389 A | 10/1997 |
| CN | 1343292 A | 4/2002 |
| CN | 1456855 A | 11/2003 |
| CN | 1517610 A | 8/2004 |
| CN | 1518477 A | 8/2004 |
| CN | 1666081 A | 9/2005 |
| CN | 200958820 Y | 10/2007 |
| CN | 101405559 A | 4/2009 |
| CN | 101421580 A | 4/2009 |
| CN | 101469090 A | 7/2009 |
| CN | 201906567 U | 7/2011 |
| CN | 102165268 A | 8/2011 |
| CN | 102232015 A | 11/2011 |
| CN | 102395419 A | 3/2012 |
| CN | 102548727 A | 7/2012 |
| CN | 102549361 A | 7/2012 |
| CN | 102933931 A | 2/2013 |
| CN | 103827595 A | 5/2014 |
| CN | 104583706 A | 4/2015 |
| CN | 105121989 A | 12/2015 |
| CN | 105164474 A | 12/2015 |
| CN | 105283715 A | 1/2016 |
| CN | 101512238 A | 8/2016 |
| DE | 10143092 A1 | 3/2003 |
| EP | 0448991 A2 | 10/1991 |
| EP | 0661502 A2 | 7/1995 |
| EP | 1108575 A1 | 6/2001 |

(56) References Cited

FOREIGN PATENT DOCUMENTS

| | | |
|---|---|---|
| FR | 2291457 A1 | 6/1976 |
| GB | 1354502 A | 6/1974 |
| JP | 61-52594 A | 3/1986 |
| JP | 05157282 A | 6/1993 |
| JP | 09196482 A | 7/1997 |
| JP | 10-170177 A | 6/1998 |
| JP | 2008-070046 A | 3/2008 |
| JP | 2009-275955 A | 11/2009 |
| TW | I271499 B | 1/2007 |
| WO | WO 96 41107 | 12/1996 |
| WO | WO 99 14535 | 3/1999 |
| WO | WO-0135039 A1 | 5/2001 |
| WO | WO-03049835 A1 | 6/2003 |
| WO | WO-2013192397 A1 | 12/2003 |
| WO | WO-2004065875 A1 | 8/2004 |
| WO | WO-2008037079 A1 | 4/2008 |
| WO | WO-2008053367 A2 | 5/2008 |
| WO | WO-2008089484 A1 | 7/2008 |
| WO | WO 2009/094032 | 7/2009 |
| WO | WO-2009158030 A1 | 12/2009 |
| WO | WO-2011062808 A1 | 5/2011 |
| WO | WO 2011/161547 | 12/2011 |
| WO | WO-2011161547 A3 | 12/2011 |
| WO | WO-2012018089 A1 | 2/2012 |
| WO | WO-2012042553 A1 | 4/2012 |
| WO | WO-2012087273 A1 | 6/2012 |
| WO | WO-2012167366 A1 | 12/2012 |
| WO | WO-2013094206 A1 | 6/2013 |
| WO | WO-2013107554 A1 | 7/2013 |
| WO | WO-2014029003 | 2/2014 |
| WO | WO-2014029003 A1 | 2/2014 |
| WO | WO-2014029004 | 2/2014 |
| WO | WO 2014107790 | 7/2014 |
| WO | WO-2014138846 | 9/2014 |
| WO | WO-2014138847 A1 | 9/2014 |
| WO | WO-2014138859 | 9/2014 |
| WO | WO-2014138860 | 9/2014 |
| WO | WO-2016026042 A1 | 2/2016 |

OTHER PUBLICATIONS

Notification of Transmittal of the International Search Report and the Written Opinion of the International Searching Authority for counterpart application PCT/CA2012/000749, mailed Oct. 26, 2012.
Acker; "Industrial Dehumidification: Water Vapor Load Calculations and System Descriptions"; HPAC Heating/Piping/Air Conditioning; Mar. 1999; pp. 49-59.
ASHRAE Technical Committee; Meeting Programs; Jan. 29, 1997 to Jan. 25, 2001 (13 pages).
Bellia et al.; "Air Conditioning Systems With Desiccant Wheel for Italian Climates"; International Journal on Architectural Science; vol. 1; No. 4; 2000; (pp. 193-213).
Chant et al.; "A Steady-State Simulation of an Advanced Desiccant-Enhanced Cooling and Dehumidification System"; ASHRAE Transactions: Research; Jul. 1992; pp. 339-347.
Coad; "Conditioning Ventilation Air for Improved Performance and Air Quality"; HPAC Heating/Piping/Air Conditioning; Sep. 1999; pp. 49-56.
Des Champs Laboratories, Inc.; "Dehumidification Solutions"; 2001; (18 pages).
Des Champs Technologies; "Desi-Wringer™ Precision Desiccant Dehumidification Systems"; 2007; (12 pages).
DiBlasio; "Desicants in Hospitals—Conditioning a Research Facility"; Engineered Systems; Sep. 1995; (4 pages).
Downing et al.; "Operation and Maintenance for Quality Indoor Air"; Proceedings of the 7$^{th}$ Symposium on Improving Building Systems in Hot and Humid Climates, Ft. Worth, TX; Oct. 9-10, 1990; (5 pages).
Downing; "Humidity Control—No Place Like Home"; Engineered Systems; 1996; (4 pages).
Federal Technology Alert; "Two-Wheel Desiccant Dehumidification System—Technology for Dehumidification and Improving Indoor Air Quality"; Apr. 1997 (24 pages).
Fischer; "Active Desiccant Dehumidification Module Integration With Rooftop Packaged HVAC Units—Final Report Phase 3B"; Oak Ridge National Laboratory; Mar. 2002; (36 pages).
Fischer; "Optimizing IAQ, Humidity Control, and Energy Efficiency in School Environments Through the Application of Desiccant-Based Total Energy Recovery Systems"; IAQ 96/Paths to Better Building Environments/Environmental Effects on Health and Productivity; Date unknown (pp. 179-194).
Harriman, III et al.; "Dehumidification and Cooling Loads From Ventilation Air"; ASHRAE Journal; Nov. 1997; (pp. 37-45).
Harrimann, III et al.; "New Weather Data for Energy Calculations"; ASHRAE Journal; Mar. 1999; (pp. 31-38).
Harriman, III et al.; "Evaluating Active Desiccant Systems for Ventilating Commercial Buildings"; ASHRAE Journal; Oct. 1999; (pp. 25-34).
"Heating, Ventilating, and Air Conditioning (HVAC) Demonstration"; Chapter 8—HVAC Demonstration; (pp. 65-77 and 157-158).
Jeong et al.; "Energy Conservation Benefits of a Dedicated Outdoor Air System with Parallel Sensible Cooling by Ceiling Radiant Panels"; ASHRAE Transactions; vol. 109; Part 2; 2003; (10 pages).
Kosar et al.; "Dehumidification Issues of Standard 62-1989"; ASHARE Journal; Mar. 1998; (pp. 71-75).
AAONAIRE Energy Recovery Units Users Information Manual.
Mc Gahey; "New Commercial Applications for Desiccant-Based Cooling"; ASHARE Journal; Jul. 1998; (pp. 41-45).
Mc Gahey et al.; "Desiccants: Benefits for the Second Century of Air Conditioning"; Proceedings of the Tenth Symposium on Improving Building Systems in Hot and Humid Climates, Ft. Worth, Texas; May 13-14, 1996 (9 pages).
Mumma et al.; "Achieving Dry Outside Air in an Energy-Efficient Manner"; ASHRAE Transactions 2001; vol. 107; Part 1; (8 pages).
Mumma; "Dedicated Outdoor Air-Dual Wheel System Control Requirements"; ASHRAE Transactions 2001; vol. 107; Part 1; (9 pages).
Mumma et al.; "Extension of the Multiple Spaces Concept of ASHRAE Standard 62 to Include Infiltration, Exhaust/Exfiltration, Interzonal Transfer, and Additional Short-Circuit Paths"; ASHRAE Transactions: Symposia; Date Unknown; (pp. 1232-1241).
Mumma; "Overview of Integrating Dedicated Outdoor Air Systems With Parallel Terminal Systems"; ASHRAE Transactions 2001; vol. 107; Part 1; (7 pages).
Nimmo et al.; "DEAC: Desiccant Enhancement of Cooling-Based Dehumidification"; ASHRAE Transactions: Symposia; Date Unknown; (pp. 842-848).
Qin et al.; "Engine-driven Desiccant-assisted Hybrid Air-conditioning System"; 23$^{rd}$ World Gas Conference, Amsterdam 2006 (15 pages).
Scofield et al.; "HVAC Design for Classrooms: Divide and Conquer"; Heating/Piping/Air Conditioning; May 1993 (pp. 53-59).
"Energy Recovery—Fresh in Air Quality"; SEMCO Inc.; Date Unknown (131 pages).
Sevigny et al.; "Air Handling Unit Direct Digital Control System Retrofit to Provide Acceptable Indoor Air Quality and Global Energy Optimization"; Energy Engineering; vol. 94; No. 5; 1997; (pp. 24-43).
Shank et al.; "Selecting the Supply Air Conditions for a Dedicated Outdoor Air System Working in Parallel with Distributed Sensible Cooling Terminal Equipment"; ASHRAE Transactions 2001; vol. 107; Part 1; (10 pages).
Smith et al.; "Outdoor Air, Heat Wheels and JC Penny: A New Approach to Retail Ventilation"; Proceedings of the Eleventh Symposium on Improving Building Systems in Hot and Humid Climates, Ft. Worth, Texas; Jun. 1-2, 1998 (pp. 311).
Smith; "Schools Resolve IAQ/Humidity Problems with Desiccant Preconditioning"; Heating/Piping/Air Conditioning; Apr. 1996; (6 pages).
Swails et al.; "A Cure for Growing Pains"; www.csermag.com; Consulting Specifying Engineer; Jun. 1997 (4 pages).
"Advances in Desiccant-Based Dehumidification"; TRANE Engineers Newsletter; vol. 34-4; Date Unknown; (pp. 1-8).

(56) References Cited

OTHER PUBLICATIONS

Turpin; "Dehumidification: The Problem No One Wants to Talk About (Apr. 2000)"; http//www.esmagazine.com/copyright/de12c1c879ba8010VgnVCM100000f932a8c0_? . . . May 6, 2011 (6 pages).

Yborra; "Field Evaluation of Desiccant-Integrated HVAC Systems: A Review of Case Studies in Multiple Commercial/Institutional Building Types"; Proceedings of the Eleventh Symposium on Improving Building Systems in Hot and Humid Climates, Ft. Worth, Texas; Jun. 1-2, 1998;(pp. 361-370).

"Performance analysis of a liquid desiccant and membrane contactor hybrid air-conditioning system," Bergero, Chiari, *Energy and Buildings*, 2010.

Communication regarding EP 12827918.9, dated Jul. 6, 2015 and Jul. 23, 2015.

"Aaonaire Energy Recovery Units Users Information Manual", (Aug. 2006), 16 pgs.

"U.S. Appl. No. 13/702,596, Appeal Brief dated Jun. 15, 2015", 82 pgs.

"U.S. Appl. No. 13/702,596, Final Office Action dated Jan. 30, 2015", 15 pgs.

"U.S. Appl. No. 13/702,596, Non Final Office Action dated Oct. 30, 2014", 16 pgs.

"U.S. Appl. No. 13/702,596, Notice of Allowance dated Oct. 1, 2015", 7 pgs.

"U.S. Appl. No. 13/702,596, Notice of Allowance dated Nov. 25, 2015", 2 pgs.

"U.S. Appl. No. 13/702,596, Post Allowance Amendment dated Oct. 7, 2015", 13 pgs.

"U.S. Appl. No. 13/702,596, PTO Response to Rule 312 Communication dated Oct. 19, 2015", 2 pgs.

"U.S. Appl. No. 13/702,596, Response filed Dec. 15, 2014 to Non Final Office Action dated Oct. 30, 2014", 21 pgs.

"U.S. Appl. No. 13/797,062, Appeal Brief filed Jun. 9, 2016", 33 pgs.

"U.S. Appl. No. 13/797,062, Final Office Action dated Feb. 24, 2016", 29 pgs.

"U.S. Appl. No. 13/797,062, Non Final Office Action dated May 7, 2015", 19 pgs.

"U.S. Appl. No. 13/797,062, Non Final Office Action dated Sep. 25, 2015", 24 pgs.

"U.S. Appl. No. 13/797,062, Response filed Apr. 23, 2015 to Restriction Requirement dated Mar. 13, 2015", 3 pgs.

"U.S. Appl. No. 13/797,062, Response filed Jul. 17, 2015 to Non Final Office Action dated May 7, 2015", 16 pgs.

"U.S. Appl. No. 13/797,062, Response filed Nov. 30, 2015 to Non Final Office Action dated Sep. 25, 2015", 16 pgs.

"U.S. Appl. No. 13/797,062, Restriction Requirement dated Mar. 13, 2015", 8 pgs.

"U.S. Appl. No. 13/797,152, Appeal Brief filed Jun. 9, 2016", 29 pgs.

"U.S. Appl. No. 13/797,152, Final Office Action dated Feb. 25, 2016", 14 pgs.

"U.S. Appl. No. 13/797,152, Non Final Office Action dated Aug. 25, 2015", 10 pgs.

"U.S. Appl. No. 13/797,152, Notice of Allowance dated Oct. 31, 2016", 7 pgs.

"U.S. Appl. No. 13/797,152, Response filed Nov. 20, 2015 to Non Final Office Action dated Aug. 25, 2015", 12 pgs.

"U.S. Appl. No. 13/801,280, 312 Amendment filed Jun. 18, 2015", 8 pgs.

"U.S. Appl. No. 13/801,280, Non Final Office Action dated Feb. 12, 2015", 7 pgs.

"U.S. Appl. No. 13/801,280, Notice of Allowance dated May 19, 2015", 7 pgs.

"U.S. Appl. No. 13/801,280, PTO Response to 312 Amendment dated Jul. 9, 2015", 2 pgs.

"U.S. Appl. No. 13/801,280, Response filed Jan. 7, 2015 to Restriction Requirement dated Dec. 10, 2014", 1 pg.

"U.S. Appl. No. 13/801,280, Response filed Mar. 31, 2015 to Non Final Office Action dated Feb. 12, 2015", 9 pgs.

"U.S. Appl. No. 13/801,280, Restriction Requirement dated Dec. 10, 2014", 9 pgs.

"U.S. Appl. No. 14/171,951, Advisory Action dated Nov. 10, 2016", 3 pgs.

"U.S. Appl. No. 14/171,951, Final Office Action dated Jun. 28, 2016", 36 pgs.

"U.S. Appl. No. 14/171,951, Non Final Office Action dated Jan. 5, 2016", 20 pgs.

"U.S. Appl. No. 14/171,951, Non Final Office Action dated May 2, 2016", 35 pgs.

"U.S. Appl. No. 14/171,951, Response filed Mar. 28, 2016 to Non Final Office Action dated Jan. 5, 2016", 18 pgs.

"U.S. Appl. No. 14/171,951, Response filed Jun. 9, 2016 to Non Final Office Action dated May 2, 2016", 24 pgs.

"U.S. Appl. No. 14/171,951, Response filed Oct. 28, 2016 to Final Office Action dated Jun. 28, 2016", 15 pgs.

"U.S. Appl. No. 14/171,951, Response filed Dec. 3, 2015 to Restriction Requirement dated Nov. 16, 2015", 6 pgs.

"U.S. Appl. No. 14/171,951, Response filed Dec. 15, 2016 to Advisory Action dated Nov. 10, 2016", 16 pgs.

"U.S. Appl. No. 14/171,951, Restriction Requirement dated Nov. 16, 2015", 13 pgs.

"U.S. Appl. No. 14/187,413, Advisory Action dated Nov. 10, 2016", 4 pgs.

"U.S. Appl. No. 14/187,413, Final Office Action dated Jul. 28, 2016", 20 pgs.

"U.S. Appl. No. 14/187,413, Non Final Office Action dated Mar. 17, 2016", 15 pgs.

"U.S. Appl. No. 14/187,413, Response filed Feb. 25, 2015 to Restriction Requirement dated Feb. 16, 2016", 3 pgs.

"U.S. Appl. No. 14/187,413, Response filed May 26, 2016 to Non Final Office Action dated Mar. 17, 2016", 15 pgs.

"U.S. Appl. No. 14/187,413, Response filed Oct. 28, 2016 to Final Office Action dated Jul. 28, 2016", 17 pgs.

"U.S. Appl. No. 14/187,413, Response filed Dec. 21, 2016 to Advisory Action dated Nov. 10, 2016", 15 pgs.

"U.S. Appl. No. 14/187,413, Restriction Requirement dated Feb. 16, 2016", 6 pgs.

"U.S. Appl. No. 14/804,953, Non Final Office Action dated Sep. 15, 2016", 8 pgs.

"U.S. Appl. No. 14/804,953, Response filed Dec. 15, 2016 to Non Final Office Action dated Sep. 15, 2016", 7 pgs.

"Australian Application Serial No. 2011268661, First Examiner Report dated Sep. 24, 2014", 5 pgs.

"Australian Application Serial No. 2011268661, Response filed Jul. 20, 2015 to First Examiner Report dated Sep. 24, 2014", 8 pgs.

"Australian Application Serial No. 2011268661, Response filed Sep. 23, 2015 to Second Examiner Report dated Aug. 18, 2015", 5 pgs.

"Australian Application Serial No. 2011268661, Second Examiner Report dated Aug. 18, 2015", 6 pgs.

"Australian Application Serial No. 2012304223, First Examiner Report dated Aug. 5, 2016", 4 pgs.

"Canadian Application Serial No. 2,801,352, Office Action dated Aug. 15, 2016", 3 pgs.

"Canadian Application Serial No. 2,843,763, Office Action dated Dec. 4, 2014", 3 pgs.

"Canadian Application Serial No. 2,843,763, Response filed May 12, 2015 to Office Action dated Dec. 4, 2014", 31 pgs.

"Canadian Application Serial No. 2,901,483, Office Action dated Nov. 23, 2016", 4 pgs.

"Chinese Application Serial No. 201180031103.9, Office Action dated Feb. 11, 2015", (w/English Translation), 16 pgs.

"Chinese Application Serial No. 201180031103.9, Office Action dated Jun. 13, 2014", (With English Translation), 19 pgs.

"Chinese Application Serial No. 201180031103.9, Office Action dated Sep. 9, 2015", (w/ English Translation), 3 pgs.

"Chinese Application Serial No. 201180031103.9, Office Action dated Nov. 6, 2015", (w/ English Translation), 5 pgs.

(56) References Cited

OTHER PUBLICATIONS

"Chinese Application Serial No. 201180031103.9, Response filed Apr. 27, 2015 to Office Action dated Feb. 11, 2015", (w/ English Translation), 15 pgs.
"Chinese Application Serial No. 201180031103.9, Response filed Sep. 26, 2014 to Office Action dated Jun. 13, 2014", (w/ English Translation), 12 pgs.
"Chinese Application Serial No. 201180031103.9, Response filed Sep. 29, 2015 to Office Action dated Sep. 9, 2015", (w/ English Translation), 78 pgs.
"Chinese Application Serial No. 201280042778.8, Office Action dated Feb. 3, 2016", (With English Translation), 9 pgs.
"Chinese Application Serial No. 201280042778.8, Office Action dated Sep. 7, 2016", 3 pgs.
"Chinese Application Serial No. 201280042778.8, Response filed May 25, 2016 to Office Action dated Feb. 3, 2016", Without English Translation of Claims, 46 pgs.
"Chinese Application Serial No. 201280042778.8, Response filed Nov. 16, 2016 to Office Action dated Sep. 7, 2016", Without English Translation of Claims, 43 pgs.
"Chinese Application Serial No. 201380042926.0, Office Action dated Feb. 26, 2016", (With English Translation), 15 pgs.
"Chinese Application Serial No. 201380042926.0, Office Action dated Sep. 28, 2016", (w/ English Translation), 12 pgs.
"Chinese Application Serial No. 201380042926.0, Response filed Jul. 7, 2016 to Office Action dated Feb. 26, 2016", Without English Translation of Claims, 36 pgs.
"Chinese Application Serial No. 201380044484.3, Office Action dated Jan. 13, 2017", (w/ English Translation), 16 pgs.
"Chinese Application dated No. 201380044484.3, Office Action dated Mar. 28, 2016", (w/ English Translation), 16 pgs.
"Chinese Application Serial No. 201380044484.3, Response filed Oct. 12, 2016 to Office Action dated Mar. 28, 2016", (w/ English Translation of Claims), 54 pgs.
"Chinese Application Serial No. 201480015355.6, Office Action dated Nov. 28, 2016", (W/ English Translation), 8 pgs.
"Chinese Application Serial No. 201480015422.4, Office Action dated Nov. 1, 2016", (w/ English Translation), 13 pgs.
"Chinese Application Serial No. 201480015766.5, Office Action dated Oct. 19, 2016", (w/ English Translation), 9 pgs.
"European Application Serial No. 11797695.1, Extended European Search Report dated Jun. 25, 2016", 11 pgs.
"European Application Serial No. 11797695.1, Partial Supplementary European Search Report dated Oct. 7, 2015", 6 pgs.
"European Application Serial No. 11797695.1, Response filed Aug. 22, 2016 to Extended European Search Report dated Jun. 25, 2016", 9 pgs.
"European Application Serial No. 12827918.9, Response filed Sep. 28, 2015 to Extended European Search Report dated Jul. 6, 2015", 8 pgs.
"European Application Serial No. 13830357.3, Extended European Search Report dated Jun. 8, 2016", 5 pgs.
"European Application Serial No. 13830357.3, Response filed Dec. 23, 2016 to Extended European Search Report dated Jun. 8, 2016", 11 pgs.
"European Application Serial No. 13830940.6, Extended European Search Report dated Jul. 4, 2016", 5 pgs.
"European Application Serial No. 14764192.2, Extended European Search Report dated Oct. 27, 2016", 7 pgs.
"European Application Serial No. 14764192.2, Response filed Apr. 13, 2016 to Communication Pursuant Rules 161(2) and 162 EPC dated Nov. 19, 2015", 9 pgs.
"European Application Serial No. 14764305.0, Response filed Apr. 13, 2016 to Communication Pursuant to Article 94(3) EPC dated Oct. 8, 2015", 10 pgs.
"European Application Serial No. 14764318.3, Response filed Jan. 28, 2016 to Communication pursuant to Rules 161(1) and 162 EPC dated Nov. 19, 2015", 17 pgs.
"European Application Serial No. 14764713.5, Extended European Search Report dated Dec. 9, 2016", 6 pgs.
"European Application Serial No. 14764713.5, Response filed Jan. 28, 2016 to Communication pursuant to Rules 161(1) and 162 EPC mailed Dec. 2, 2015", 9 pgs.
"European Application Serial No. 14765396.8, Extended European Search Report dated Oct. 28, 2016", 6 pgs.
"European Application Serial No. 14765396.8, Office Action dated Nov. 20, 2015", 2 pgs.
"European Application Serial No. 14765396.8, Response filed Jan. 29, 2016 to Office Action dated Nov. 20, 2015", 12 pgs.
"International Application Serial No. PCT/CA2013/000608, International Preliminary Report on Patentability dated Mar. 5, 2015", 7 pgs.
"International Application Serial No. PCT/CA2013/000608, International Search Report dated Sep. 23, 2013", 3 pgs.
"International Application Serial No. PCT/CA2013/000608, Written Opinion dated Sep. 23, 2013", 5 pgs.
"International Application Serial No. PCT/CA2013/000609, International Preliminary Report on Patentability dated Mar. 5, 2015", 7 pgs.
"International Application Serial No. PCT/CA2013/000609, International Search Report dated Sep. 17, 2013", 3 pgs.
"International Application Serial No. PCT/CA2013/000609, Written Opinion dated Sep. 17, 2013", 5 pgs.
"International Application Serial No. PCT/CA2014/000048, International Preliminary Report on Patentability dated Sep. 24, 2015", 8 pgs.
"International Application Serial No. PCT/CA2014/000048, International Search Report dated Apr. 29, 2014", 3 pgs.
"International Application Serial No. PCT/CA2014/000048, Written Opinion dated Apr. 29, 2014", 6 pgs.
"International Application Serial No. PCT/CA2014/000083, International Preliminary Report on Patentability dated Sep. 24, 2015", 9 pgs.
"International Application Serial No. PCT/CA2014/000083, International Search Report dated May 14, 2014", 3 pgs.
"International Application Serial No. PCT/CA2014/000083, Written Opinion dated May 14, 2014", 7 pgs.
"International Application Serial No. PCT/CA2014/000148, International Preliminary Report on Patentability dated Sep. 24, 2015", 5 pgs.
"International Application Serial No. PCT/CA2014/000148, International Search Report dated May 9, 2014", 4 pgs.
"International Application Serial No. PCT/CA2014/000148, Written Opinion mailed May 9, 2014", 3 pgs.
"International Application Serial No. PCT/CA2014/000169, International Preliminary Report on Patentability dated Sep. 24, 2015", 8 pgs.
"International Application Serial No. PCT/CA2014/000169, International Search Report dated May 27, 2014", 3 pgs.
"International Application Serial No. PCT/CA2014/000169, Written Opinion dated May 27, 2014", 6 pgs.
"International Application Serial No. PCT/CA2014/000171, International Preliminary Report on Patentability dated Sep. 24, 2015", 7 pgs.
"International Application Serial No. PCT/CA2014/000171, International Search Report dated May 27, 2014", 3 pgs.
"International Application Serial No. PCT/CA2014/000171, Written Opinion dated May 27, 2014", 5 pgs.
"International Application Serial No. PCT/CA2015/050787, International Search Report dated Nov. 4, 2015", 3 pgs.
"International Application Serial No. PCT/CA2015/050787, Written Opinion dated Nov. 4, 2015", 3 pgs.
"International Application Serial No. PCT/CA2016/050252, International Search Report dated May 26, 2016", 3 pgs.
"International Application Serial No. PCT/CA2016/050252, Written Opinion dated May 26, 2016", 4 pgs.
"International Application Serial No. PCT/CA2016/050507, International Search Report dated Jul. 21, 2016", 3 pgs.
"International Application Serial No. PCT/CA2016/050507, Written Opinion dated Jul. 21, 2016", 3 pgs.
"International Application Serial No. PCT/IB2011/002145, International Preliminary Report on Patentability dated Jan. 10, 2013", 13 pgs.

(56) References Cited

OTHER PUBLICATIONS

"International Application Serial No. PCT/IB2011/002145, International Search Report dated Feb. 15, 2012", 7 pgs.
"International Application Serial No. PCT/IB2011/002145, Written Opinion dated Feb. 15, 2012", 11 pgs.
"International Application Serial No. PCT/IB2016/053799, International Search Report dated Aug. 26, 2016", 3 pgs.
"International Application Serial No. PCT/IB2016/053799, Written Opinion dated Aug. 26, 2016", 6 pgs.
"Plane plate membrane contactor prototypes", University of Genoa.
Abdel-Salam, Mohamed R. H., et al., "Experimental Study of Effects of Phase-Change Energy and Operating Parameters on Performances of Two-Fluid and Three-Fluid Liquid-to-Air Membrane Energy Exchangers", ASHRAE Transactions, vol. 122, Part 1, (Jan. 2016), 134-145.
Abdel-Salam, Mohamed R. H., et al., "Performance testing of 2-fluid and 3-fluid liquid-to-air membrane energy exchangers for HVAC applications in cold-dry climates", International Journal of Heat and Mass Transfer, 106, (2017), 558-569.
Abdel-Salam, Mohamed R. H., et al., "Performance testing of a novel 3-fluid liquid-to-air membrane energy exchanger (3-fluid LAMEE) under desiccant solution regeneration operating conditions", International Journal of Heat and Mass Transfer, 95, (2015), 773-786.
Bergero, et al., "On the performances of a hybrid air-conditioning system in different climatic conditions", Energy 36, (2011), 5261-5273.
Erb, et al., "Experimental Measurements of a Run-Around Membrane Energy Exchanger (RAMEE) with Comparison to a Numerical Model", ASHRAE Transactions, (2009).
Karniadakis, et al., "Mimimum-dissipation transport enhancement by flow destabilization: Reynolds' analogy revisited", J. Fluid Mech vol. 192, (1988), 365-391.
Larson, Michael David, et al., "The Performance of Membranes in a Newly Proposed Run-Around Heat and Mositure Exchanger", Thesis Submitted to the College of Graduate Studies and Research in Partial Fulfillment of the Requirements for the Degree of Master of Science in the Department of Mechanical Engineering UniversitY of Saskatchewan Saskatoon Canada, http/ /lib ran. usask.ca/theses/available/etd-12192006-094159/umestricted/ Larson Thesis.pdf, (Dec. 2006), 177 pgs.
Lepoudre, et al., "Channel Flow with Sinusoidal Screen Insert", Dept. of Mech Engineering, Univ. of Saskatchewan.
Mahmud, Khizir, "Design and Performance Testing of Counter-Cross-Flow Run-Around Membrane Energy Exchanger System", Master Thesis Submitted to the College of Graduate Studies and Research in Partial Fulfillment of the Requirements for the Degree of Master of Science in the Department of Mechanical Engineering University of Saskatchewan Saskatoon Canada, http I /libran. usask. ca/theses/ available/ etd-09092009-223 833/umestricted/Khizir_ Mahmud 2009-Sep-28a. pdf, (Sep. 2009), 168 pgs.
Mahmud, Khizir, et al., "Performance testing of a counter-cross-flow run-around membrane energy exchanger (RAMEE) system for HVAC applications", Energy and Buildings 42, (2010), 1139-1147.
Mahmud, Khizir, et al., "Performance testing of a counter-cross-flow run-around membrane energy exchanger (RAMEE) system for HVAC applications", Energy and Buildings, 42, (2010), 1140-1146.
Ryan, et al., "Three-dimensional transition in the wake of bluff elongated cylinders", J. Fluid, Mech vol. 538, (2005), 1-29.
Sorin, et al., "Optimization of Flow Design in Forced Flow Electrochemical Systems, with Special Application to Electrodialysis", Ind. Eng. Chem, Process Des. Develop vol. 13, No. 3, (1974).
Vali, et al., "Numerical model and effectiveness correlations for a run-around heat recovery system with combined counter and cross flow exchangers", International Journal of Heat and Mass Transfer 52, (2009), 5827-5840 pgs.
Vali, Alireza, "Modeling a Run-Around Heat and Moisture Exchanger Using Two Counter/Cross Flow Exchangers", Master Thesis Submitted to the College of Graduate Studies and Research in Partial Fulfillment of the Requirements For the Degree of Master of Science In the Department of Mechanical Engineering University of Saskatchewan Saskatoon Canada, http:/ /library. usask.ca/theses/ m ailable/etd-060 3 2009-15-J.6-J-1./unrestricted/ Vali.Alireza Thesis.pdf, (2009), 193 pgs.
"U.S. Appl. No. 13/797,152, Corrected Notice of Allowance dated Mar. 9, 2017", 7 pgs.
"U.S. Appl. No. 13/797,152, Notice of Allowance dated Mar. 9, 2017", 7 pgs.
"U.S. Appl. No. 14/171,951, Notice of Allowance dated Feb. 3, 2017", 5 pgs.
"U.S. Appl. No. 14/171,951, Notice of Allowance dated Jun. 8, 2017", 5 pgs.
"U.S. Appl. No. 14/187,413, Non Final Office Action dated Feb. 8, 2017", 15 pgs.
"U.S. Appl. No. 14/190,715, Restriction Requirement dated Apr. 13, 2017", 7 pgs.
"U.S. Appl. No. 14/192,019, Non Final Office Action dated May 19, 2017", 15 pgs.
"U.S. Appl. No. 14/804,953, Notice of Allowance dated Feb. 27, 2017", 7 pgs.
"U.S. Appl. No. 14/804,953, Notice of Allowance dated May 9, 2017", 7 pgs.
"U.S. Appl. No. 14/957,795, Non Final Office Action dated Apr. 3, 2017", 19 pgs.
"Australian Application Serial No. 2012304223, Response filed Feb. 16, 2017 to First Examiner Report dated Aug. 5, 2016", 25 pgs.
"Australian Application Serial No. 2013305427, Examination Report dated Mar. 3, 2017", 4 pgs.
"Australian Application Serial No. 2015230799, First Examiner Report dated Mar. 27, 2017", 10 pgs.
"Canadian Application Serial No. 2,801 352, Response filed Feb. 8, 2017 to Office Action dated Aug. 15, 2016", 89 pgs.
"Canadian Application Serial No. 2,901,483, Response filed May 23, 2017 to Office Action dated Nov. 23, 2016", 40 pgs.
"Chinese Application Serial No. 201380042926.0, Office Action dated May 11, 2017", W/ English Translation, 13 pgs.
"Chinese Application Serial No. 201380042926.0, Response filed Feb. 13, 2017 to Office Action dated Sep. 28, 2016", (w/ English Translation of Amended Claims), 56 pgs.
"Chinese Application Serial No. 201380044484.3, Response filed Mar. 28, 2017 to Office Action dated Jan. 13, 2017", (w/ English Translation of Claims), 58 pgs.
"Chinese Application Serial No. 201480015422.4, Response filed May 12, 2017 to Office Action dated Nov. 1, 2016", w/ claims in English, 47 pgs.
"Chinese Application Serial No. 201480015766.5, Response filed Jan. 20, 2017 to Office Action dated Oct. 19, 2016", (w/ English Translation of Claims), 52 pgs.
"European Application Serial No. 13830940.6, Response filed Jan. 16, 2017 to Communication Pursuant to Rules 70(2) and 70a(2) EPC dated Jul. 21, 2016", 1 pg.
"European Application Serial No. 14764192.2, Response filed Jan. 30, 2017 to Extended European Search Report dated Oct. 27, 2016", 19 pgs.
"European Application Serial No. 14764305.0, Extended European Search Report dated Apr. 4, 2017", 8 pgs.
"European Application Serial No. 14764318.3, Extended European Search Report dated Mar. 15, 2017", 10 pgs.
"European Application Serial No. 14765396.8, Response filed May 25, 2017 to Extended European Search Report dated Oct. 28, 2016", 5 pgs.
"International Application Serial No. PCT/CA2017/050180, International Search Report dated Apr. 26, 2017", 3 pgs.
"International Application Serial No. PCT/CA2017/050180, Written Opinion dated Apr. 26, 2017", 4 pgs.

* cited by examiner

ENERGY EXCHANGE SYSTEM FOR CONDITIONING AIR IN AN ENCLOSED STRUCTURE

CROSS REFERENCE TO RELATED APPLICATION

The present application relates to and claims priority from U.S. Provisional Application Ser. No. 61/530,810 filed Sep. 2, 2011, entitled "Energy Exchange System for Conditioning Air in an Enclosed Structure," which is hereby expressly incorporated by reference in its entirety.

The present application also relates to and claims priority from U.S. Provisional Application Ser. No. 61/584,617 filed Jan. 9, 2012, entitled "Energy Exchange System for Conditioning Air in an Enclosed Structure," which is hereby expressly incorporated by reference in its entirety.

BACKGROUND OF THE INVENTION

The subject matter described herein relates generally to an energy exchange system for conditioning air in an enclosed structure, and more particularly, to an energy exchange system having at least one energy recovery device and a moisture control loop, which may circulate a liquid desiccant, for example.

Enclosed structures, such as occupied buildings, factories and animal barns, generally include a heating, ventilation, and air-conditioning (HVAC) system for conditioning ventilated and/or recirculated air in the structure. The HVAC system includes a supply air flow path and a return and/or exhaust air flow path. The supply air flow path receives air, for example outside or ambient air, re-circulated air, or outside or ambient air mixed with re-circulated air, and channels and distributes the air into the enclosed structure. The air is conditioned by the HVAC system to provide a desired temperature and humidity of supply air discharged into the enclosed structure. The exhaust air flow path discharges air back to the environment outside the structure, or ambient air conditions outside the structure. Without energy recovery, conditioning the supply air typically requires a significant amount of auxiliary energy. This is especially true in environments having extreme outside or ambient air conditions that are much different than the required supply air temperature and humidity. Accordingly, energy exchange or recovery systems are typically used to recover energy from the exhaust air flow path. Energy recovered from air in the exhaust flow path is utilized to reduce the energy required to condition the supply air.

Conventional energy exchange systems may utilize energy recovery devices (for example, energy wheels and permeable plate exchangers) or heat exchange devices (for example, heat wheels, plate exchangers, heat-pipe exchangers and run-around heat exchangers) positioned in both the supply air flow path and the exhaust air flow path. Liquid-to-Air Membrane Energy Exchangers (LAMEEs) are fluidly coupled so that a desiccant liquid flows between the LAMEEs in a run-around loop, similar to run-around heat exchangers that typically use aqueous glycol as a coupling fluid. When the only auxiliary energy used for such a loop is for desiccant liquid circulation pumps and external air-flow fans, the run-around system is referred to as a passive run-around membrane energy exchange (RAMEE) system, otherwise it is an active RAMEE system with controlled auxiliary heat and/or water inputs or extractions.

For the passive RAMEE system with one or more LAMEEs in each of the exhaust and supply air ducts, energy in the form of heat and water vapor is transferred between the LAMEEs in the supply and exhaust ducts, which is interpreted as the transfer of sensible (heat) and latent (moisture) energy between the exhaust air and the supply air. For example, the exhaust air LAMEE may recover heat and moisture from the exhaust air to transfer the heat and moisture to the supply air during winter conditions to heat and humidify the supply air. Conversely, during summer conditions, the supply air LAMEE may transfer heat and moisture from the supply air to the exhaust air to cool and dehumidify the supply air.

A Dedicated Outdoor Air System (DOAS) is an example of an HVAC system that typically does not return conditioned air back to the supply stream, but typically conditions ambient air to desired supply air conditions through a combination of heating, cooling, dehumidification, and/or humidification. A typical DOAS may include a vapor compression system or a liquid desiccant system. When the ambient air is hot and humid, the vapor compression system cools the supply air down to its dewpoint in order to dehumidify the air, which typically overcools the air. This process is inefficient because the air typically is reheated before it is supplied.

On the other hand, a liquid desiccant system does not overcool the supply air. However, traditional liquid desiccant systems typically require significantly more energy to condition the air. Moreover, a liquid desiccant system is generally a direct contact system, which is susceptible to transporting aerosolized desiccant downstream, where it may damage HVAC equipment.

SUMMARY OF THE INVENTION

Certain embodiments provide an energy exchange system that includes a supply air flow path, an exhaust air flow path, an energy recovery device disposed within the supply and exhaust air flow paths, and a supply conditioning unit disposed within the supply air flow path. The supply conditioning unit may be downstream from the energy recovery device. The system may also include a regenerator disposed within the exhaust air flow path, and a liquid handling device in fluid communication with the supply conditioning unit and the regenerator. The regenerator may be configured to be operated during off-hours to regenerate a desiccant circulated by the liquid handling device. The liquid handling device may contain and circulate one or more of liquid desiccant, water, glycol.

The liquid handling device may include a liquid source. A concentration of liquid within the liquid handling device may be configured to be adjusted through the liquid source.

The liquid handling device may include a moisture transfer loop in fluid communication with a supply loop and a regenerator loop.

The liquid handling device may include a first heat exchanger in a supply fluid path, a second heat exchanger in an exhaust fluid path, and a conditioner, such as a heat exchange device, that circulates heat transfer fluid between the first and second heat exchangers.

The system may also include at least one more conditioner downstream or upstream of the first and second heat exchangers.

The system may also include a moisture transfer loop in fluid communication with a supply loop and a regenerator loop. The moisture transfer loop may include a desiccant supply conduit and a desiccant return conduit. At least portions of the desiccant supply conduit and the desiccant return conduit may contact one another in a manner that facilitates thermal energy transfer therebetween. The desiccant supply conduit may be formed concentric within, or concentric to, the desiccant return conduit. The desiccant supply conduit may be arranged co-radial with the desiccant return conduit with flow occurring in opposite directions through the desiccant supply and return conduits.

The supply conditioning unit may include a liquid-to-air membrane energy exchanger (LAMEE).

The system may also include a return air duct that fluidly connects the supply air flow path and the exhaust air flow path. The return air duct may connect to the supply air flow path downstream from the supply conditioning unit.

The system may also include at least one post-conditioner disposed in one or both of the supply air flow path or the return air duct.

The system may also include a pre-conditioner disposed downstream of the energy recovery device and upstream of the supply conditioning unit in the supply air flow path. The system may also include a pre-conditioner disposed downstream of the energy recovery device and the regenerator in the exhaust air flow path.

The system may also include a remote conditioner.

In an embodiment, the supply air flow path and the exhaust air flow path may be connected to a plurality of zone conditioners. The plurality of zone conditioners may include the supply conditioning unit. That is, the supply conditioning unit may be one of the plurality of zone conditioners.

The system may also include at least one control unit that monitors and controls operation of the system. The at least one control unit may operate the system to selectively control one or both of humidity or temperature.

Certain embodiments provide an energy exchange system that includes a supply air flow path, an exhaust air flow path, a supply conditioning unit disposed within the supply air flow path, a regenerator disposed within the exhaust air flow path, and a liquid handling device in fluid communication with the supply conditioning unit and the regenerator. The liquid handling device may include a moisture transfer loop. The liquid handling device may include first and second heat exchangers in fluid communication with a first heat exchange fluid conditioner.

Certain embodiments provide an energy exchange system that includes a supply air flow path, an exhaust air flow path, an energy recovery device disposed within the supply and exhaust air flow paths, a supply liquid-to-air membrane energy exchanger (LAMEE) disposed within the supply air flow path, wherein the supply LAMEE is downstream from the energy recovery device, an exhaust liquid-to-air membrane energy exchanger (LAMEE) disposed within the exhaust air flow path, and a liquid handling device in fluid communication with the supply LAMEE and the exhaust LAMER The liquid handling device may include a moisture transfer loop in fluid communication with a supply loop and a regenerator loop.

Certain embodiments provide a method of conditioning air comprising introducing outside air as supply air into a supply air flow path, pre-conditioning the supply air with an energy recovery device, and fully-conditioning the supply air with a supply conditioning unit that is downstream from the energy recovery device.

The method may also include regenerating desiccant contained within a liquid handling device with a regenerator disposed within the exhaust air flow path.

The method may also include circulating the desiccant through a moisture transfer loop that is in fluid communication with a supply loop and a regenerator loop.

The method may also include adjusting a concentration of liquid within the liquid handling device.

The method may also include shunting a portion of the exhaust air from the exhaust air flow path to the supply air flow path through a return air duct.

The method may also include directing the portion of the exhaust air to at least one post-conditioner disposed in one or both of the supply air flow path or the return air duct.

The method may also include monitoring and controlling operation with a control unit. The method may also include selectively controlling one or both of humidity or temperature with the control unit.

DETAILED DESCRIPTION OF THE DRAWINGS

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
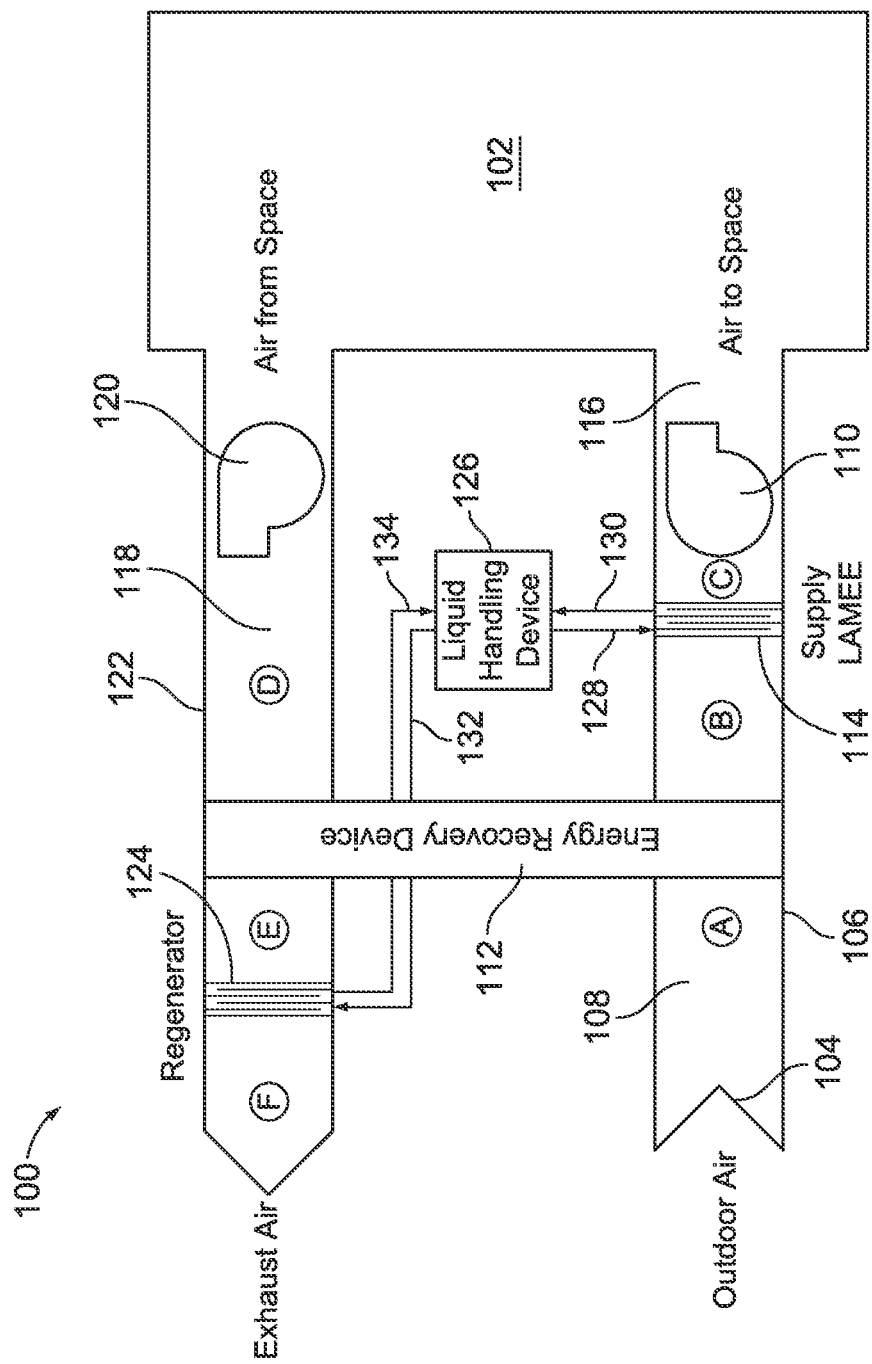
FIG. 1 illustrates a schematic view of an energy exchange system, according to an embodiment.

FIG. 1 illustrates a schematic view of an energy exchange system 100 according to an embodiment. The system 100 is configured to partly or fully condition air supplied to a structure 102, such as a building or an enclosed room. The system 100 includes an air inlet 104 fluidly connected to a supply flow path 106. The supply flow path 106 may channel air 108 (such as ambient or outside air, air from a building adjacent to the enclosed structure 102, or return air from a room within the enclosed structure 102) to the enclosed structure 102. Air 108 in the supply flow path 106 may be moved through the supply flow path 106 by a fan or fan array 110. The illustrated embodiment shows the fan 110 located downstream of an energy recovery device 112 and a supply conditioning unit, such as a Liquid-to-Air Membrane Energy Exchange (LAMEE) 114. Optionally, the fan 110 may be positioned upstream of the energy recovery device 112 and/or the supply LAMEE 114. Also, alternatively, air 108 within the supply flow path 106 may be moved by multiple fans or a fan array or before and/or after the supply LAMEE 114.

Airflow passes from the inlet 104 through the supply flow path 106 where the air first encounters a process side or portion of the energy recovery device 112. As explained in more detail below, the energy recovery device 112 uses exhaust air to pre-condition the supply air within the flow path 106, thereby decreasing the amount of work that the supply LAMEE 114 performs to fully condition the supply air. For example, during a winter mode operation, the energy recovery device 112 may pre-condition the inlet air 108 within the supply flow path 106 by adding heat and moisture. In a summer mode operation, the energy recovery device 112 may pre-condition the air 108 by removing heat and moisture from the air. An additional energy recovery device (not shown) may be positioned downstream from the supply LAMEE 114, and upstream from the enclosed structure 102. Additionally, while the energy recovery device 112 is shown upstream of the supply LAMEE 114 within the supply flow path 106, the energy recovery device 112 may, alternatively, be positioned downstream of the supply LAMEE 114 and upstream of the enclosed structure 102.

After the supply air passes through the energy recovery device 112 in the supply flow path 106, the supply air, which at this point has been pre-conditioned, encounters the supply LAMEE 114. The supply LAMEE 114 then further or fully conditions the pre-conditioned air in the supply flow path 106 to generate a change in air temperature and humidity toward a desired supply state that is desired for supply air discharged into the enclosed structure 102. For example, during a winter mode operation, the supply LAMEE 114 may further condition the pre-conditioned air by adding heat and moisture to the pre-conditioned air in the supply flow path 106. In a summer mode operation, the supply LAMEE 114 may condition the pre-conditioned air by removing heat and moisture from the air in the supply flow path 106. Because the energy recovery device 112 has pre-conditioned the air before the air encounters the supply LAMEE 114, the supply LAMEE 114 does not have to work as hard to fully condition the air. The supply LAMEE 114 partially conditions the air in the supply flow path 106 by changing the temperature and moisture content by only a portion of the range between outside air temperature and moisture conditions and supply air discharge temperature and moisture conditions. The fully-conditioned supply air 116 then has the desired temperature and humidity for air that is supplied to the enclosed structure 102.

Exhaust or return air 118 from the enclosed structure 102 is channeled out of the enclosed structure 102, such as by way of exhaust fan 120 or fan array within an exhaust flow path 122. As shown, the exhaust fan 120 is located upstream of the energy recovery device 112 within the exhaust flow path 122. However, the exhaust fan 120 may be downstream of the energy recovery device 112 within the exhaust flow path 122. Additionally, the exhaust fan 120 may be located downstream of an exhaust LAMEE or regenerator 124 within the exhaust flow path 122. The regenerator 124 operates as a desiccant regenerator for desiccant that flows through the supply LAMEE 114. Optionally, the exhaust fan 120 may be downstream of the energy recovery device 112, but upstream of the regenerator 124 within the exhaust flow path 122.

Before encountering the regenerator 124, the exhaust air 118 first passes through a regeneration side or portion of the energy recovery device 112. The energy recovery device 112 is regenerated by the exhaust air 118 before pre-conditioning the supply air 108 within the supply flow path 106. After passing through the energy recovery device 112, the exhaust air 118 passes through the regenerator 124. Alternatively, however, the regenerator 124 may be located upstream of the energy recovery device 112 along the exhaust flow path 122.

A liquid handling device 126 may be connected between the supply LAMEE 114 and the regenerator 124. The liquid handling device 126 may be a liquid desiccant handling device (DHD). The liquid handling device 126 is configured to circulate a liquid, such as a liquid desiccant, between the supply LAMEE 114 and the regenerator 124 and to manage energy transfer therebetween.

The liquid handling device 126 sends and receives liquid, such as a desiccant, to and from the supply LAMEE 114 through outlet and inlet lines 128 and 130, respectively. The lines 128 and 130 may be pipes, conduits, or other such structures configured to convey liquid. Additionally, the liquid handling device 126 also sends and receives liquid, such as a desiccant, to and from the regenerator 124 through outlet and inlet lines 132 and 134, respectively. Similar to the lines 128 and 130, the lines 132 and 134 may be pipes, conduits, or other such structure configured to convey liquid.

The liquid handling device 126 may heat or cool the desiccant through a variety of systems, devices, and the like, such as chilled water tubes, waste heat, solar devices, combustion chambers, cogeneration, and the like. The concentration of the desiccant within the liquid handling device 126 may be controlled by diluting it with water and/or cycling it to a regenerator or exhaust LAMEE, such as the regenerator 124.

The desiccant fluid repeatedly flows between the supply LAMEE 114 and the regenerator 124 to transfer heat and moisture between the supply LAMEE 114 and the regenerator 124. As the desiccant fluid flows between the supply LAMEE 114 and the regenerator 124, the desiccant transfers heat and moisture between the supply air 108 and the return air 118.

Figure 2:
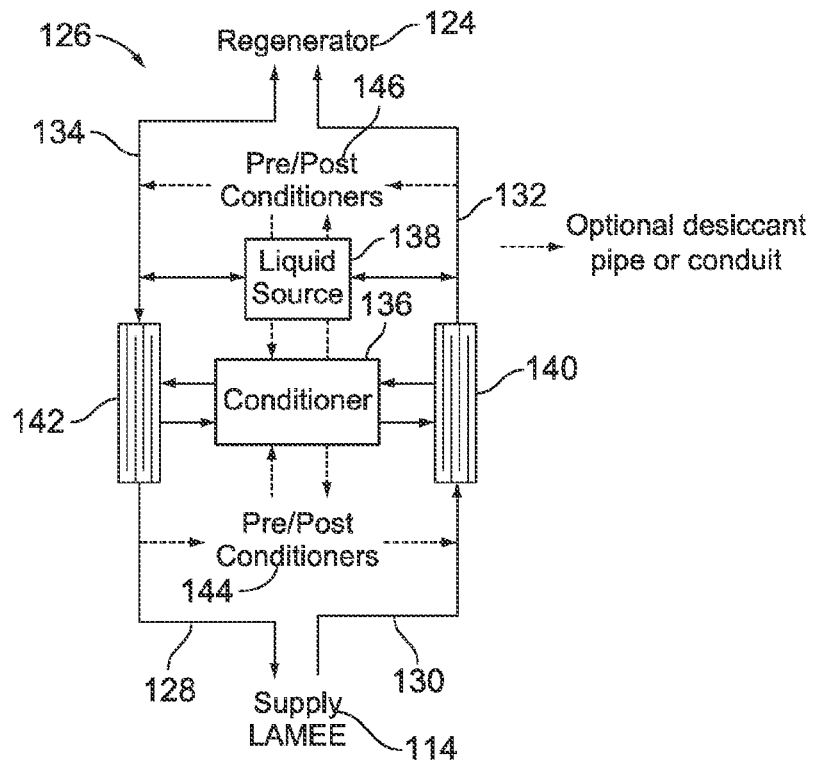
FIG. 2 illustrates a schematic view of a liquid handling device, according to an embodiment.

FIG. 2 illustrates a schematic view of the liquid handling device 126, according to an embodiment. The liquid handling device 126 may include a conditioner 136, such as a heat transfer device, a liquid source 138, numerous desiccant pipes or conduits, and several heat exchangers. Liquid, such as the desiccant, enters the liquid handling device 126 from the supply LAMEE 114 through the inlet line 130. Desiccant, or water, may be supplied to the liquid handling device 126 through the liquid source 138.

The liquid source 138 may be a device that may add and/or remove external water and/or desiccant to and from the liquid handling device 126. The liquid source 138 may be in fluid communication with the outlet and inlet lines 132 and 134, respectively. Optionally, the liquid source 138 may be in fluid communication with one or both of the outlet and inlet lines 128 and 130, respectively.

After passing into the liquid handling device 126 from the supply LAMEE 114, the desiccant then passes into a heat exchanger 140, which brings the desiccant into close contact with the heat transfer fluid, such as a refrigerant, water, glycol, or the like, in order to facilitate heat transfer therebetween. The heat transfer fluid is supplied to the heat exchanger 140 through the conditioner 136, such as a heat transfer device. The temperature of the desiccant changes as it passes through the heat exchanger 140. After passing through the heat exchanger 140, the desiccant then passes to the regenerator 124 by way of the outlet line 132.

Desiccant coming from the regenerator 124 passes into the liquid handling device 126 through the inlet line 134. The desiccant is then channeled into a heat exchanger 142, which also brings the desiccant into close contact with the heat transfer fluid, such as refrigerant, water, glycol, or the like, in order to facilitate heat transfer therebetween. As such, the temperature of the desiccant passing through the heat exchanger 142 changes before it passes into the outlet line 128, and into the supply LAMEE 114.

As shown, the liquid handling device 126 may be fluidly connected to one or more peripheral conditioners 144 that are located in air flow paths. The peripheral conditioners 144 may utilize liquid desiccant and may connect to lines 128 and 130 through pipes, conduits, or the like. Alternatively, the peripheral conditioners 144 may use heat transfer fluid from the conditioner 136, such as a heat transfer device, that flows through connective pipes or conduits.

The liquid handling device 126 may also include additional conditioners 144 and 146. The conditioners 144 and 146 may circulate the heat transfer fluid between the conditioner 136 to points before and after the heat exchangers 140 and 142. The conditioner 144 may circulate the heat transfer fluid proximate the inlet line 130 upstream of the heat exchanger 140. Additionally, the conditioner 144 may circulate the heat transfer fluid proximate the outlet line 128 downstream of the heat exchanger 142. In both instances, the conditioner 144 adds another level of heat transfer before and after the main conditioner 136. Similarly, the conditioner 146 may circulate the heat transfer fluid proximate the outlet line 132 downstream of the heat exchanger 140. Additionally, the conditioner 146 may circulate the heat transfer fluid proximate the inlet line 134 upstream of the heat exchanger 142. In both instances, the conditioner 146 adds another level of heat transfer before and after the main conditioner 136.

The conditioner 136, such as a heat transfer device, and the conditioners 144 and 146 may be contained within the liquid handling device 126. Optionally, the conditioner 136 and conditioners 144 and 146, or portions thereof, may be external to the liquid handling device 126. The conditioner 136, for example, may include a compressor, reversing valve, throttling valve, and piping, which, when combined with the heat exchangers 140 and 142 and charged with a refrigerant acts as a heat pump. Alternatively, the liquid handling device 126 may include a chilled water source from internal or external sources (for example, an internal chiller, solar adsportion chiller, geothermal source, or the like), and a hot water source from an external source, such as a boiler, combustion cycle device, solar energy, waster heat, geothermal source, or the like.

Figure 3:
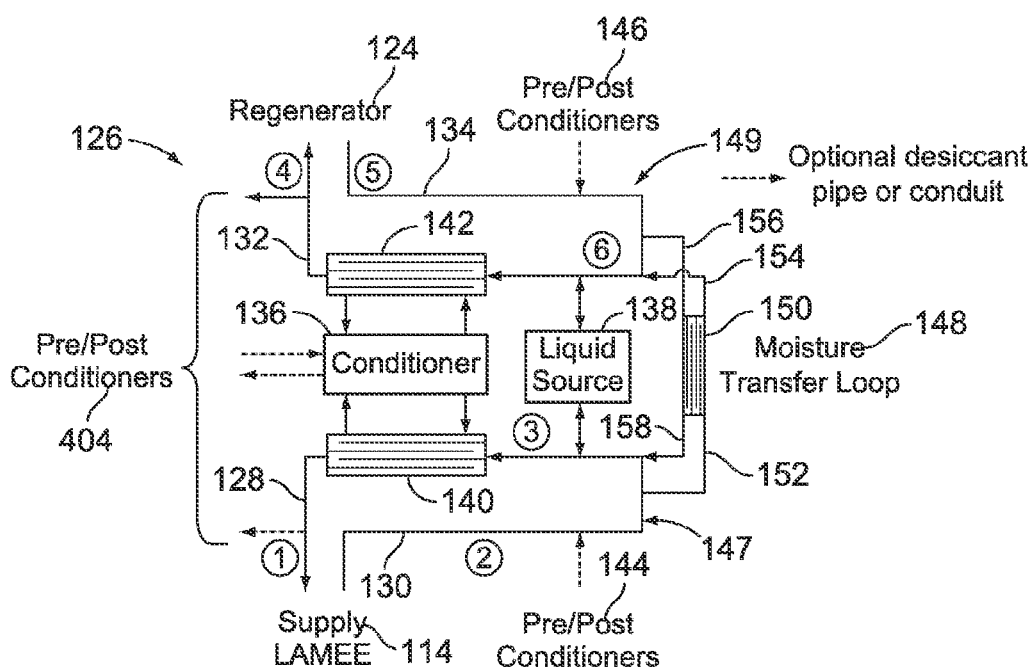
FIG. 3 illustrates a schematic view of a liquid handling device, according to an embodiment.

FIG. 3 illustrates a schematic view of the liquid handling device 126, according to an embodiment. In this embodiment, desiccant enters the liquid handling device 126 from the supply LAMEE 114 through the inlet line 130, which is fluidly connected to the heat exchanger 140. The desiccant then flows through the outlet line 128 back to the supply LAMBE 114. The inlet line 130, the heat exchanger 140 and the outlet line 128 form a supply loop 147. Similarly, desiccant from the regenerator 124 enters the liquid handling device 126 through the inlet line 134, which is fluidly connected to the heat exchanger 142, which is, in turn, fluidly connected to the outlet line 132. As such, the inlet line 134, the heat exchanger 142, and the outlet line 132 form a regenerator loop 149. The conditioner 136 and the heat exchangers 140, 142 operate similar to as described above. The liquid source 138 may also be used to add and/or remove external water and/or desiccant to and from the liquid handling device 126. The liquid handling device 126 may also be connected to peripheral conditioners, as described above.

As shown in FIG. 3, a moisture transfer loop 148 includes a heat exchanger 150 and pipes, conduits, or the like that fluidly connect the supply loop 147 to the regenerator loop 149. Desiccant may flow from the supply loop 147 to the regenerator loop 149 through a conduit 152 that is connected between the supply loop 147 and the heat exchanger 150, and a conduit 154 that is connected between the heat exchanger 150 and the regenerator loop 149. Similarly, desiccant may flow from the regenerator loop 149 through a conduit 156 that is connected between the regenerator loop 149 and the heat exchanger 150, and a conduit 158 that is connected between the heat exchanger 150 and the supply loop 147.

The amount of desiccant flowing through the moisture transfer loop 148 may be a small fraction of the desiccant flowing through the supply loop 147 and the regenerator loop 149. The desiccant flow rate in the moisture transfer loop 148 may be as great or greater, however, as the flow rate of desiccant through the supply and regenerator loops 147 and 149, respectively. The moisture transfer loop 148 enables desiccant and/or water to be transferred between the supply loop 147 and the regenerator loop 149. The heat exchanger 150 may be used to regulate the heat transfer between the supply loop 147 and the regenerator loop 149, thereby improving the efficiency of the system. Alternatively, the heat exchanger 150 may not be included in the moisture transfer loop 148.

Figure 4:
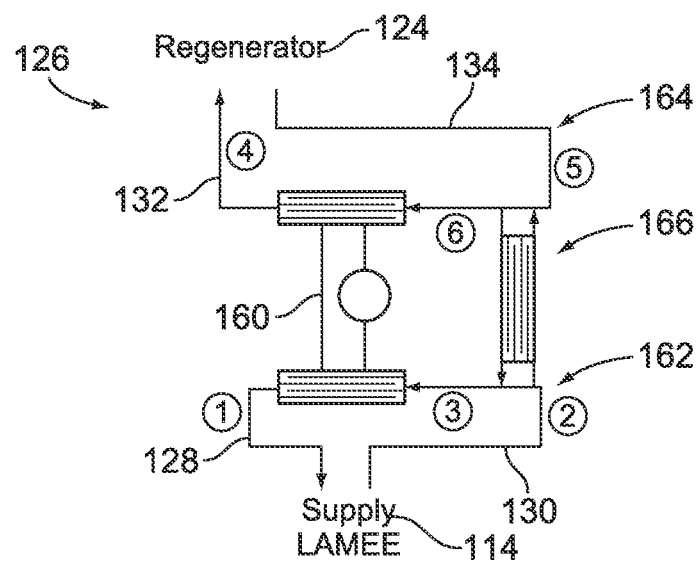
FIG. 4 illustrates a schematic view of a liquid handling device, according to an embodiment.

FIG. 4 illustrates a schematic view of the liquid handling device 126, according to an embodiment. The liquid handling device 126 may be connected between the supply LAMEE 114 and the regenerator 124. Similar to the embodiments described above, the liquid handling device 126 is configured to circulate desiccant between the supply LAMEE 114 and the regenerator 124 and to manage energy transfer therebetween. In this embodiment, the heat transfer device or conditioner and the heat exchangers may be configured as a heat pump 160 that is in fluid communication with a supply loop 162 and a regenerator loop 164. The liquid handling device 126 may also include a moisture transfer loop 166 fluidly coupled in parallel with the heat pump 160 between the supply and regenerator loops 162 and 164. The loops 162, 164, and 166 are formed of conduits that are configured to allow desiccant to pass through internal passages. The heat pump 160 is used to heat or cool the desiccant as it flows through the supply and regenerator loops 162 and 164. However, the liquid handling device 126 may, optionally, heat or cool the desiccant through a variety of other systems, devices, and the like, such as chilled water tubes, waste heat, solar devices, combustion chambers, cogeneration, and the like. The concentration of the desiccant within the liquid handling device 126 may be controlled by a variety of methods, such as diluting it with water, adding concentrated or weak desiccant, adding solid desiccant, and/or cycling it to a regenerator, such as the regenerator 124.

Referring to FIGS. 1-4, in the embodiments, the desiccant fluid repeatedly flows between the supply LAMEE 114 and the regenerator 124 to transfer heat and moisture between the supply LAMEE 114 and the regenerator 124. As the desiccant fluid flows between the supply LAMEE 114 and the regenerator 124, it transfers heat and moisture between the supply air 108 and the exhaust air 118.

Referring to FIGS. 2-4, while not shown, the liquid handling device 126 may include one or more desiccant pumps, storage tanks, reservoirs, and the like. The pumps, storage tanks, and/or reservoirs may be disposed within and/or connected to any of the pipes or conduits of the systems.

Additionally, if the liquid handling device 126 contains storage devices, such as reservoirs, the regenerator 124 may be operated during off hours to regenerate the desiccant. During off-hour operations, the conditioner 136, such as a heat transfer device, provides cooling or heating, depending on demands, to the regenerator loop 164, for example, through the heat exchanger 142. In embodiments in which the conditioner 136 includes a compressor and the heat transfer fluid is a refrigerant, a heat exchanger that is external to the system, such as a scavenger coil, may be used to transfer heat with the environment.

Figure 5:
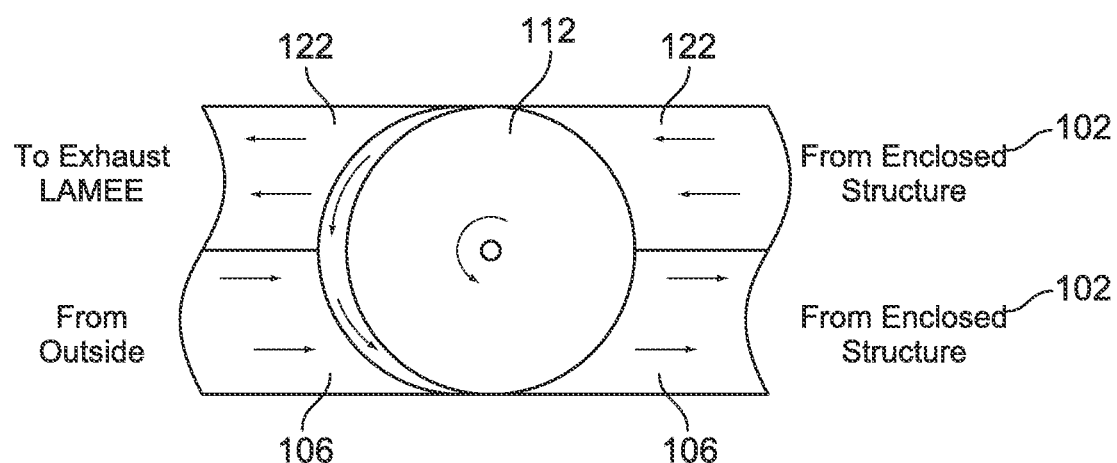
FIG. 5 illustrates a schematic view of the energy recovery device, according to an embodiment.

FIG. 5 illustrates a schematic view of the energy recovery device 112, according to an embodiment. A portion of the energy recovery device 112 is disposed within the supply flow path 106, while another portion of the energy recovery device 112 is disposed within the exhaust flow path 122. The energy recovery device 112 is configured to transfer heat and/or moisture between the supply flow path 106 and the exhaust flow path 122. The energy recovery device 112 may be one or more of various types of energy recovery devices, such as, for example, an enthalpy wheel, a sensible wheel, a desiccant wheel, a plate heat exchanger, a plate energy (heat and moisture) exchanger, a heat pipe, a run-around loop, a passive RAMEE, or the like. As shown in FIG. 5, the energy device 112 may be an enthalpy wheel.

An enthalpy wheel is a rotary air-to-air heat exchanger. As shown, supply air within the supply air path 106 passes in a direction counter-flow to the exhaust air within exhaust air path 119. For example, the supply air may flow through the lower half of the wheel, while the exhaust air flows through the upper half of the wheel. The wheel may be formed of a heat-conducting material with an optional desiccant coating.

In general, the wheel may be filled with an air permeable material resulting in a large surface area. The surface area is the medium for sensible energy transfer. As the wheel rotates between the supply and exhaust air flow paths 106 and 122, respectively, the wheel picks up heat energy from the hotter air stream and releases it into the colder air stream. Enthalpy exchange may be accomplished through the use of desiccants on an outer surface, and/or in an air permeable material, of the wheel. Desiccants transfer moisture through the process of adsorption, which is driven by the difference in the partial pressure of vapor within the opposing air streams.

Additionally, the rotational speed of the wheel also changes the amount of heat and moisture transferred. A slowly-turning desiccant coated wheel primarily transfers moisture. A faster turning desiccant coated wheel provides for both heat and moisture transfer.

Optionally, the energy recovery device 112 may be a sensible wheel, a plate exchanger, a heat pipe, a run-around apparatus, a refrigeration loop having a condenser and evaporator, a chilled water coil, or the like.

Alternatively, the energy recovery device 112 may be a flat plate exchanger. A flat plate exchanger is generally a fixed plate that has no moving parts. The exchanger may include alternating layers of plates that are separated and sealed. Because the plates are generally solid and non-permeable, only sensible energy is transferred. Optionally, the plates may be made from a selectively permeable material that allows for both sensible and latent energy transfer.

Also, the energy recovery device 112 may be a heat exchanger, such as shown and described in U.S. application Ser. No. 12/910,464 entitled "Heat Exchanger for an Equipment Rack," filed Oct. 22, 2010, which is hereby incorporated by reference in its entirety.

Alternatively, the energy recovery device 112 may be a run-around loop or coil. A run-around loop or coil includes two or more multi-row finned tube coils connected to each other by a pumped pipework circuit. The pipework is charged with a heat exchange fluid, typically water or glycol, which picks up heat from the exhaust air coil and transfers the heat to the supply air coil before returning again. Thus, heat from an exhaust air stream is transferred through multi-row finned tube coils or pipework coil to the circulating fluid, and then from the fluid through the multi-row finned tube pipework or pipework coil to the supply air stream.

Also, alternatively, the energy recovery device 112 may be a heat pipe. A heat pipe includes a sealed pipe or tube made of a material with a high thermal conductivity such as copper or aluminum at both hot and cold ends. A vacuum pump is used to remove all air from the empty heat pipe, and then the pipe is filled with a fraction of a percent by volume of coolant, such as water, ethanol, etc. Heat pipes contain no mechanical moving parts. Heat pipes employ evaporative cooling to transfer thermal energy from one point to another by the evaporation and condensation of a working fluid or coolant.

Referring again, to FIG. 1, as outdoor air enters the supply flow path 106 through the inlet 104, the unconditioned air encounters the energy recovery device 112, which may be an enthalpy wheel, flat plate exchanger, heat pipe, run-around, or the like, as discussed above. If the air is hot and humid, one or both of the temperature and humidity of the supply air is lowered by the energy recovery device 112. Sensible and/or latent energy from the supply air is transferred to the energy recovery device 112, thereby lowering the temperature and/or humidity of the supply air. In this manner, the supply air is preconditioned before it encounters the supply LAMEE 114.

If, however, the supply air is cold and dry, the temperature and/or humidity of the supply air will be raised as it encounters the energy recovery device 112. As such, in winter conditions, the energy recovery device 112 warms and/or moisturizes the supply air.

A similar process occurs as the exhaust air encounters the energy recovery device 112 in the exhaust flow path 122. The sensible and/or latent energy transferred to the energy recovery device 112 in the exhaust flow path 122 is then used to pre-condition the air within the supply flow path 106. Overall, the energy recovery device 112 pre-conditions the supply air in the supply flow path 106 before it encounters the supply LAMEE 114, and alters the exhaust air in the flow path 122 before it encounters the regenerator 124. In this manner, the LAMEE 114 and the regenerator 124 do not use as much energy as they normally would if the energy recovery device 112 was not in place. Therefore, the LAMEE 114 and the regenerator 124 run more efficiently.

As noted above, however, the supply LAMEE 114 may be upstream of the energy recovery device 112 within the supply flow path 106. Similarly, the regenerator 124 may be upstream of the energy recovery device 112 within the exhaust flow path 122, or in a separate airstream (such as a scavenger or ambient airstream).

After passing through the energy recovery device 112 in the supply flow path 106, the pre-conditioned air next encounters the supply LAMEE 114, which fully conditions the supply air to the desired conditions.

Figure 6:
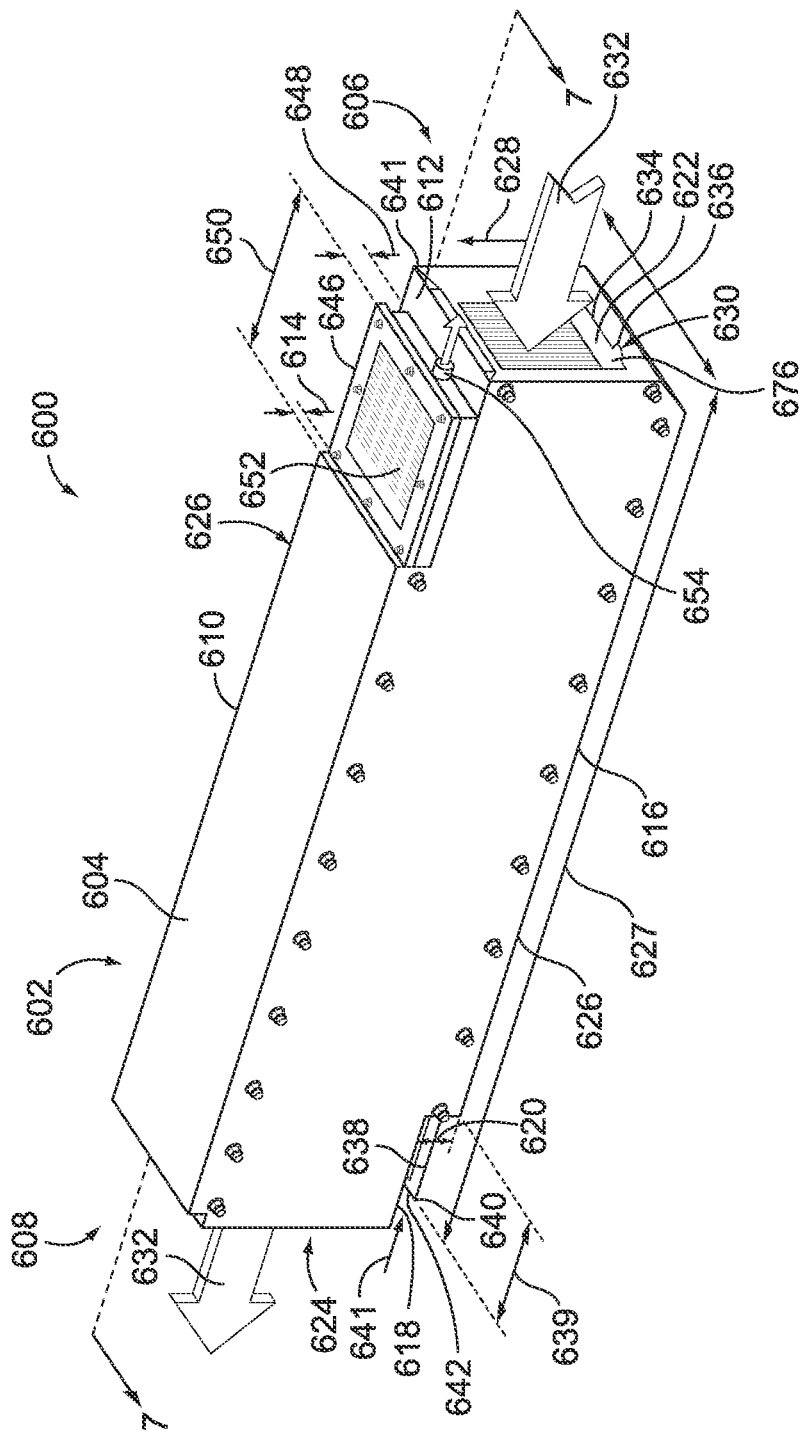
FIG. 6 illustrates an isometric top view of a LAMEE, according to an embodiment.

FIG. 6 illustrates an isometric top view of a LAMEE 600 according to an embodiment. The LAMEE 600 may be used as the supply air LAMEE 114 and/or the return or exhaust air LAMEE 124 (shown in FIG. 1). The LAMEE 600 includes a housing 602 having a body 604. The body 604 includes an air inlet end 606 and an air outlet end 608. A top 610 extends between the air inlet end 606 and the air outlet end 608. A stepped-down top 612 is positioned at the air inlet end 606. The stepped-down top 612 is stepped a distance 614 from the top 610. A bottom 616 extends between the air inlet end 606 and the air outlet end 608. A stepped-up bottom 618 is positioned at the air outlet end 608. The stepped-up bottom 618 is stepped a distance 620 from the bottom 616. In alternative designs the stepped-up 618 or stepped-down 612 sections may have different sizes of steps or no step at all.

Figure 7:
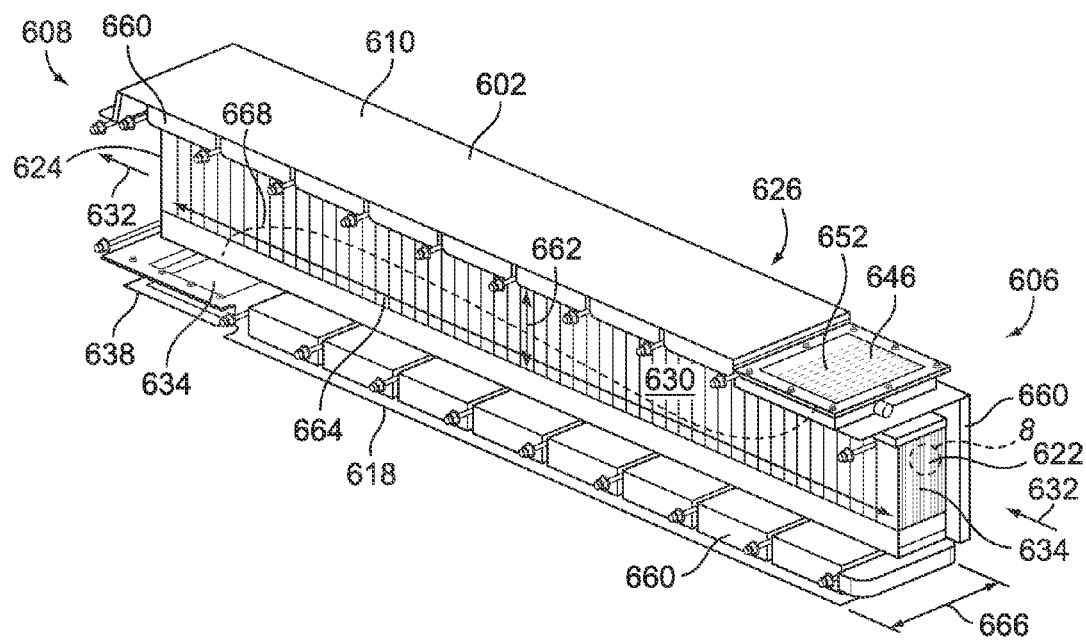
FIG. 7 illustrates an isometric view of a LAMEE having a cutout along the line 7-7 shown in FIG. 6, according to an embodiment.

An air inlet 622 is positioned at the air inlet end 606. An air outlet 624 is positioned at the air outlet end 608. Sides 626 extend between the air inlet 622 and the air outlet 624. Each panel in the LAMEE 600 has a semi-permeable membrane length 664, as shown in FIG. 7. Also shown in FIG. 7, each panel in the LAMEE 600 has a semi-permeable membrane height 662 defining an energy exchange area that extends a height (H) between a top and a bottom defined by the top and bottom of the semi-permeable membrane. The energy exchange area extends a length (L) between a front and a back that is defined by the front and the back of the semi-permeable membrane. An exchanger aspect ratio (AR) is defined by a height (H) 662 of each semi-permeable membrane energy exchange area divided by a length (L) 664 of the energy exchange area.

An energy exchange cavity 630 extends through the housing of the LAMEE 600. The energy exchange cavity 630 extends from the air inlet end 606 to the air outlet end 608. An air stream 632 is received in the air inlet 622 and flows through the energy exchange cavity 630. The air stream 632 is discharged from the energy exchange cavity 630 at the air outlet 624. The energy exchange cavity 630 includes a plurality of panels 634. Each liquid flow panel forms a liquid desiccant channel 676 that is confined by the semi-permeable membranes 678 on either side and is configured to carry desiccant 641 therethrough. The semi-permeable membranes 678 are arranged in parallel to form air channels 636 with an average flow channel width of 637 and liquid desiccant channels 676 with an average flow channel width of 677. The air stream 632 travels through the air channels 636 between the semi-permeable membranes 678. The desiccant 641 in each desiccant channel 676 exchanges heat and moisture with the air stream 632 in the air channels 636 through the semi-permeable membranes 678.

A desiccant inlet reservoir 638 is positioned on the stepped-up bottom 618. The desiccant inlet reservoir 638 extends a length 639 of the LAMEE body 604. The desiccant inlet reservoir 638 extends a length 639 that is configured to meet a predetermined performance of the LAMEE 600.

The liquid desiccant inlet reservoir 338 is configured to receive desiccant 341 from the liquid handling device 126, shown in FIGS. 1-4 The desiccant inlet reservoir 638 includes an inlet 642 in flow communication with a storage tank. The desiccant 641 is received through the inlet 642. The desiccant inlet reservoir 638 includes an outlet 644 that is in fluid communication with the desiccant channels 676 in the energy exchange cavity 630. The liquid desiccant 641 flows through the outlet 644 into the desiccant channels 676. The desiccant 641 flows along the panels 634 through desiccant channel 676 to a desiccant outlet reservoir 646. The desiccant outlet reservoir 646 is positioned on the stepped-down top 612 of the LAMEE housing 602. Alternatively, the desiccant outlet reservoir 646 may be positioned at any location along the top 612 of the LAMEE housing 602 or alternatively on the side of the reservoir with a flow path connected to all the panels. The desiccant outlet reservoir 646 has a height 648. The desiccant outlet reservoir 646 extends along the top 612 of the LAMEE housing 602 for a length 650. The desiccant outlet reservoir 646 is configured to receive desiccant 641 from the desiccant channels 676 in the energy exchange cavity 630. The desiccant outlet reservoir 646 includes an inlet 652 in flow communication with the desiccant channels 676. The desiccant 641 is received from the desiccant channels 676 through the inlet 652. The desiccant outlet reservoir 646 includes an outlet 654. In an alternative embodiment, the desiccant outlet reservoir 646 may be positioned along the bottom 618 of the LAMEE housing 602 and the desiccant inlet reservoir 638 may be positioned along the top 610 of the LAMEE housing 602.

In the illustrated embodiment, the LAMEE 600 includes one liquid desiccant outlet reservoir 646 and one liquid desiccant inlet reservoir 638. Alternatively, the LAMEE 600 may include liquid desiccant outlet reservoirs 646 and liquid desiccant inlet reservoirs 638 on the top and bottom of each end of a LAMEE 600.

FIG. 7 illustrates an isometric view of the LAMEE 600 having a cutout along the line 7-7 shown in FIG. 6. The top 610 and the bottom 618 of the LAMEE housing 602 include insulation 660 joined thereto. The sides 626 of the LAMEE housing 602 also include insulation 660. Except for the air inlet and outlet areas, the insulation 660 extends around the energy exchange cavity 630. The insulation 660 limits an amount of heat that may be exchanged between the air and liquid desiccant flowing through the energy exchange cavity and the surroundings as the air and liquid desiccant flow through the channels in the energy exchange cavity compared to the heat rate for the air for the supply and exhaust air flows. The insulation 660 may include foam insulation, fiber insulation, gel insulation, or the like. The insulation 660 is selected to at least partially meet a predetermined performance of the LAMEE 600.

The energy exchange cavity 630 has a height 662, a length 664, and a width 666. The height 662 is defined between the top and bottom of the energy exchange cavity 630. The width 666 is defined between the insulation side walls of the energy exchange cavity 630. The length 664 is defined between the air inlet 622 and the air outlet 624 of the energy exchange cavity 630. Each energy exchange panel 634 extends the height 662 and length 664 of the energy exchange cavity 630. The panels 634 are spaced along the width 666 of the energy exchange cavity 630.

For a counter/cross flow LAMEE, the liquid desiccant flow inlet 634 of the desiccant inlet reservoir 638 is in flow communication with the energy exchange cavity 630 at the air outlet end 608 of the LAMEE 600. The liquid desiccant outlet 652 of the desiccant outlet reservoir 646 is in flow communication with the energy exchange cavity 630 at the air inlet end 606 of the LAMEE 600. The desiccant inlet reservoir 638 and the desiccant outlet reservoir 646 are in fluid communication with the liquid channel 676. The panels 634 define a non-linear liquid desiccant flow path 668 between the desiccant inlet reservoir 638 and the desiccant outlet reservoir 646. The flow path 668 illustrates one embodiment of a counter/cross flow path with respect to the direction of the air stream 632. In one embodiment, a desiccant flow direction through the desiccant channels 676 is controlled so that lower density desiccant flows separately from higher density desiccant.

Figure 8:
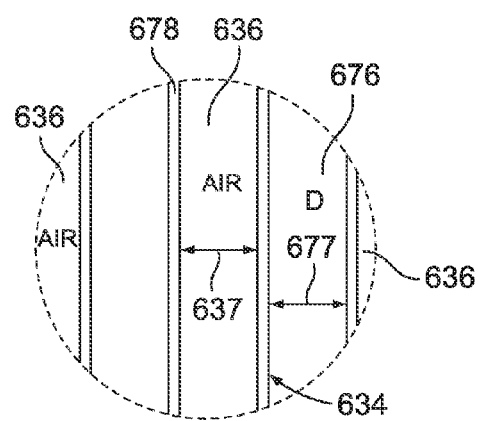
FIG. 8 illustrates a front view of panels shown in FIG. 7, according to an embodiment.

FIG. 8 illustrates a front view of the panels 634. The panels 634 are spaced to form air channels 636 and the liquid desiccant channels 676 there-between separated by semi-petineable membranes 678. The air channels 636 alternate with the liquid desiccant channels 676. Except for the two side panels of the energy exchange cavity, each air channel 636 is positioned between adjacent liquid desiccant channels 676. The liquid desiccant channels 676 are positioned between adjacent air channels 636. The air channels 636 have an average channel width 637 defined between adjacent panels 634. The membranes 678 separate the air from the desiccant. Accordingly, the membranes 678 prevent the desiccant from migrating into the air.

The LAMEE 600 is further described in PCT application No. PCT/US11/41397 entitled "Liquid-To-Air Membrane Energy Exchanger," filed Jun. 22, 2011, which is hereby incorporated by reference in its entirety.

Figure 9:
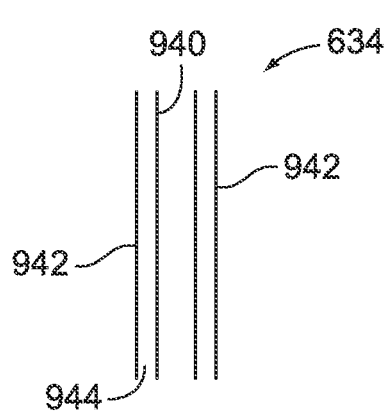
FIG. 9 illustrates a front view of panels shown in FIG. 7, according to an embodiment.

FIG. 9 illustrates a simplified front view of a panel 634, according to an embodiment. In this embodiment, a plastic inner channel 940 or tube contains liquid coolant, such as water, glycol, or the like. An outer membrane 942 surrounds the plastic inner channel 940 such that fluid cavities 944 are formed between both outer surfaces of the plastic channel 940 and the inner surfaces of the membrane 944. Desiccant flows through the fluid cavity 944. The coolant within the plastic channel 940 absorbs the latent energy from moisture when the moisture is absorbed by the desiccant and also provides sensible cooling.

Figure 10:
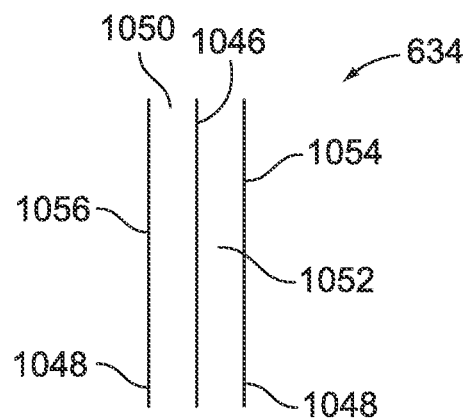
FIG. 10 illustrates a front view of panels shown in FIG. 7, according to an embodiment.

FIG. 10 illustrates a simplified front view of a panel 634 according to an embodiment. In this embodiment, a plastic layer 1046 separates the two layers of the membrane 1048 into a desiccant flow path 1050 and a water flow path 1052. Purge air 1056 is adjacent the membrane 1048 proximate the water flow path 1052, while air 1056 is adjacent the membrane 1048 proximate the desiccant flow path 1050.

Referring again to FIG. 1, the supply LAMEE 114 is configured to fully-condition the pre-conditioned supply air after it passes through the energy recovery device 112 in the supply flow path 106. The supply LAMEE 114 is connected to the liquid handling device 126, which, in turn, is connected to the regenerator 124. The pre-conditioned supply air within the flow path 106 is fully conditioned through the liquid desiccant that is exchanged between the supply LAMEE 114 and the regenerator 124 by way of the liquid handling device 122.

Liquid desiccant within the supply LAMEE 114 passes out of the LAMEE 114 into inlet line 130. At this point, the temperature and water content of the liquid desiccant have both changed, as latent and sensible energy has been transferred from the pre-conditioned air to the liquid desiccant. The pre-conditioned air has now become fully-conditioned and passes out of the LAMEE 114 toward the enclosed structure 102.

The desiccant then passes through the inlet line 130 toward the liquid transfer device 126, such as shown and described in any of FIGS. 2-4. As discussed with respect to FIGS. 3 and 4, in particular, the liquid handling device 126 may include a moisture transfer loop in fluid communication with a supply loop and a regenerator loop.

Figure 11:
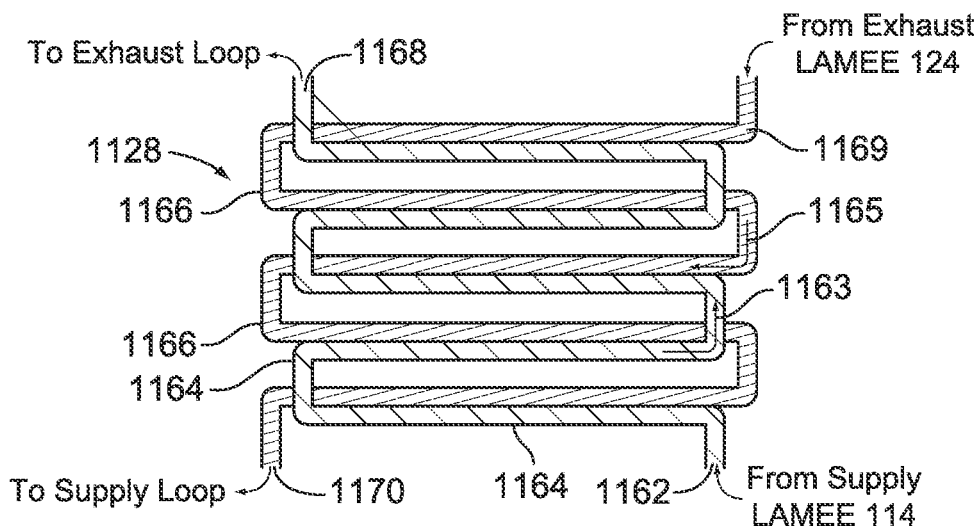
FIG. 11 illustrates a front view of a moisture transfer loop, according to an embodiment.

FIG. 11 illustrates a front view of a conceptual illustration of a moisture transfer loop 1128, according to an embodiment. The moisture transfer loops shown and described with respect to FIGS. 3 and 4, for example, may be similar to the moisture transfer loop 1128.

The moisture transfer loop 1128 may include a supply inlet 1162 in fluid communication with the inlet line 130 (shown in FIG. 1). A portion of the desiccant solution within the inlet line 130 from the supply LAMEE 114 enters the inlet 1162. The inlet 1162 is part of a coiled pipe 1164 that extends along another coiled pipe 1166 that receives desiccant solution from the regenerator 124. The pipes 1164 and 1166 may be formed together or separate, but engage one another in a manner that facilitates thermal energy transfer therebetween. In general, the desiccant solution entering at inlets 1162 and 1169 have different temperatures and moisture contents. As the desiccant solutions flow in opposed directions (as noted by arrows 1163 and 1165), the temperature difference therebetween reduces, such that the desiccant solution exiting at outlet 1168 is relatively close to the temperature of the desiccant solution at the outlet 1170. The temperatures of the desiccants within adjacent pipes 1164 and 1166 will tend to begin to balance or equilibrate. Thus, if the desiccant within the pipe 1164 is hotter than the desiccant in the pipe 1166, the temperature of the desiccant within the pipe 1164 will decrease as it moves toward the outlet 1168, while the temperature of the desiccant within the pipe 1166 will increase as it moves toward the outlet 1170. Similarly, as desiccant solution from the supply loop discharges at outlet 1168 into the regenerator loop, and as desiccant solution from the regenerator loop discharges at outlet 1170 into the supply loop, moisture is exchanged therebetween. This will facilitate moisture transfer between the supply and regenerator loops without affecting the temperature of the solution in the supply and regenerator loops. In this manner, the moisture absorbed into the desiccant solution from the supply LAMEE 114 in the supply loop is transferred to the regenerator loop through the moisture loop 1128, with minimal heat transfer between the supply and regenerator loops.

Figure 12:
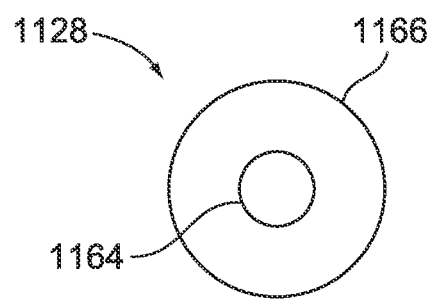
FIG. 12 illustrates an axial cross-section of a pipe section of a moisture transfer loop, according to an embodiment.

FIG. 12 illustrates an axial cross-section of a pipe section of a moisture transfer loop 1128 according to an embodiment. In this embodiment, supply desiccant pipe 1164 is formed to be concentric and co-radial with a regenerator exhaust desiccant pipe 1166. As shown, the supply pipe 1164 is within the regenerator pipe 1166 (although this orientation may be reversed). Therefore, exhaust desiccant solution flows outside of the supply pipe 1164 in an opposite direction from that of the supply desiccant solution within the supply pipe 1164. In this manner, sensible energy is transferred between the counter-flowing desiccant solutions.

Referring again to FIGS. 1, 3, 4, 11, and 12 as desiccant from the supply LAMEE 114 passes along the moisture transfer loop 148, 166, or 1128, the temperature of the desiccant solution tend toward equilibrium with that of the desiccant solution from the regenerator 124 that passes into the moisture transfer loop 148, 166, or 1128. The supply desiccant solution (in the summer, for example, the temperature of the desiccant passing out of outlet 1168 will be less than that entering the inlet 1162, and vice versa in the winter) then passes into additional conditioning devices, as described with respect to FIGS. 3 and 4, where it is further conditioned before it passes into the regenerator 124.

As the conditioned desiccant enters the regenerator 124, latent and sensible energy from the desiccant within the LAMEE 124 is exchanged with the exhaust air passing through the LAMEE 124. The desiccant then absorbs or desorbs energy, depending on the temperature and humidity of the exhaust air within the exhaust flow path 122, and passes into an outlet of the LAMEE 124. In a similar fashion as described above with respect to the moisture transfer loop 1128, a portion of the desiccant from the LAMEE 124 enters the moisture transfer loop 148, 166, or 1128 and tends to equilibrate with the supply desiccant.

As noted, in an embodiment, only a portion of the desiccant from the supply LAMEE 114 and a portion of the desiccant from the regenerator 124 enters the moisture transfer loop 148, 166, or 1128. However, the bulk of the desiccant passes directly into the heat exchangers 140 or 142 that are connected to the conditioner 136, such as a heat transfer device, as discussed with respect to FIGS. 3 and 4, for example, which conditions the desiccant. Nevertheless, the moisture transfer loop 148, 166, or 1128 provides a system that enables the conditioning device, such as the heat pump 160 shown in FIG. 4 to operate more efficiently.

Additionally, the moisture transfer loop is configured to transfer moisture between the supply and regenerator loops. As an example, during dehumidification, desiccant passing through the supply LAMEE 114 is diluted (decreased in concentration), while the desiccant passing through the regenerator 124 is concentrated. If the supply and regenerator loops are not connected, their concentrations continuously change until they are in equilibrium with their respective airstream and no longer exchange moisture. Connecting the two loops together with the moisture transfer loop allows some of the dilute desiccant from the supply loop to be replaced with some concentrated desiccant from the regenerator loop, and vice versa. The transfer maintains the desired desiccant concentration in the two loops. Also, the mass flow rate of salt between the two loops is equal, thereby resulting in a net moisture transfer from the supply loop to the regenerator loop (in the case of winter) due to the two loops being at different concentrations.

Table 1 shows exemplary temperatures and humidities of air at various points within the system 100 as shown in FIG. 1 (during summer conditions for 2000 cfm):

TABLE I

| Point | Temperature | Humidity (grams/kg) |
|---|---|---|
| A | 35.0° C. | 16.8 g/kg |
| B | 26.0° C. | 10.9 g/kg |
| C | 21.1° C. | 7.1 g/kg |
| D | 24.0° C. | 9.3 g/kg |
| E | 33.0° C. | 15.2 g/kg |
| F | 40.5° C. | 18.9 g/kg |

TABLE I-continued

As shown in Table 1, the temperature and humidity of the supply air at point A is higher than the pre-conditioned air at point B, which is immediately downstream of the energy recovery device 112. Similarly, the fully-conditioned air at point C, just downstream from the supply LAMEE 114, exhibits a lower temperature and lower humidity relative to the pre-conditioned air at point B.

Next, the exhaust air at point D in the flow path 122 exhibits a lower temperature and lower humidity relative to the air at point E, just downstream of the energy recovery device 112. This is due to the fact that latent and sensible energy transferred from the supply air in the flow path 1106 to the energy recovery device 112 is then transferred to the exhaust air in the flow path 122. As such, the heat and humidity of the energy recovery device 112 is lowered, and the energy recovery device 112 is then equipped to receive additional sensible and latent energy from the supply air within the flow path 106.

Additionally, the temperature and humidity of the exhaust air within the flow path 122 is higher at point F, than at point E. This is because desiccant within the regenerator 124 having relatively high sensible and latent energy transfers a portion of those energies to the exhaust air, which is then vented to the atmosphere, while the desiccant is cooled and dried, and sent back to the liquid handling device 126.

If, however, winter conditions existed in which the incoming supply air was to be heated and humidified, the data would exhibit the opposite trend. That is, at point A, the air temperature would be cooler and drier than at point C, for example. Further, the temperature and humidity at point D would be warmer and more humid than at point F.

Table 2 shows exemplary desiccant solution conditions of air at various points within the liquid handling device 126 (during summer conditions for 2000 cfm) as shown in FIG. 4, for example:

TABLE 2

| Point | Temperature | % Desiccant of Fluid Solution |
|---|---|---|
| 1 | 20.7° C. | 30.5% |
| 2 | 23.4° C. | 30.4% |
| 3 | 23.6° C. | 30.5% |
| 4 | 41.2° C. | 31.7% |
| 5 | 37.9° C. | 31.7% |
| 6 | 37.7° C. | 31.7% |

As shown above, at point 1 in the liquid handling device 126 shown in FIG. 4, the temperature of the desiccant is lower prior to entering the supply LAMEE 114, then when it exits the supply LAMEE 114 into the inlet line 130 at point 2. Additionally, a point 3, where the desiccant from the regenerator 124 intermingles with the majority of the desiccant from the supply LAMEE 114, the temperature is slightly higher than at point 2.

Also, the temperature of the desiccant at point 4, just prior to it entering the regenerator 124 is higher than the temperature of the desiccant at point 5, after the desiccant passes out of the LAMEE 124 into the inlet line 134. However, the temperature of the desiccant at point 6, where it intermingles with desiccant from the supply LAMEE 114 that has passed out of the moisture transfer loop 148, is slightly less than at point 5.

Again, though, if winter conditions existed, the data trend would essentially be the opposite.

Similarly, with respect to FIG. 3, at point 1 in the liquid handling device 126 shown in FIG. 4, the temperature of the desiccant is lower prior to entering the supply LAMEE 114, then when it exits the supply LAMEE 114 into the inlet line 130 at point 2. Additionally, a point 3, where the desiccant from the regenerator 124 that passes through the moisture transfer loop 148 intermingles with the desiccant in the supply loop 147, the temperature is slightly higher than at point 2.

Also, the temperature of the desiccant at point 4, just prior to it entering the regenerator 124 is higher than the temperature of the desiccant at point 5, after the desiccant passes out of the LAMEE 124 into the inlet line 134. However, the temperature of the desiccant at point 6, where it intermingles with portion of the desiccant from the supply LAMEE 114 that has passed out of the moisture transfer loop 148, is slightly less than at point 5.

Again, though, if winter conditions existed, the data trend would essentially be the opposite.

Table 3 below shows the energy transfer between various points in the system 100 (during summer conditions for 2000 cfm):

TABLE 3

| From | To | Energy Transfer |
| --- | --- | --- |
| A | B | −27.5 kW (−7.8 tons) |
| B | C | −16.4 kW (−4.6 tons) |
| D | E | 27. kW 97.8 tons) |
| E | F | 19.5 kW (5.5 tons) |
| 3 | 1 | −17.3 kW (−4.9 tons) |
| 6 | 4 | 20.6 kw (5.9 tons) |

Again, though, if winter instead of summer, the data trend would essentially be the opposite.

Figure 13:
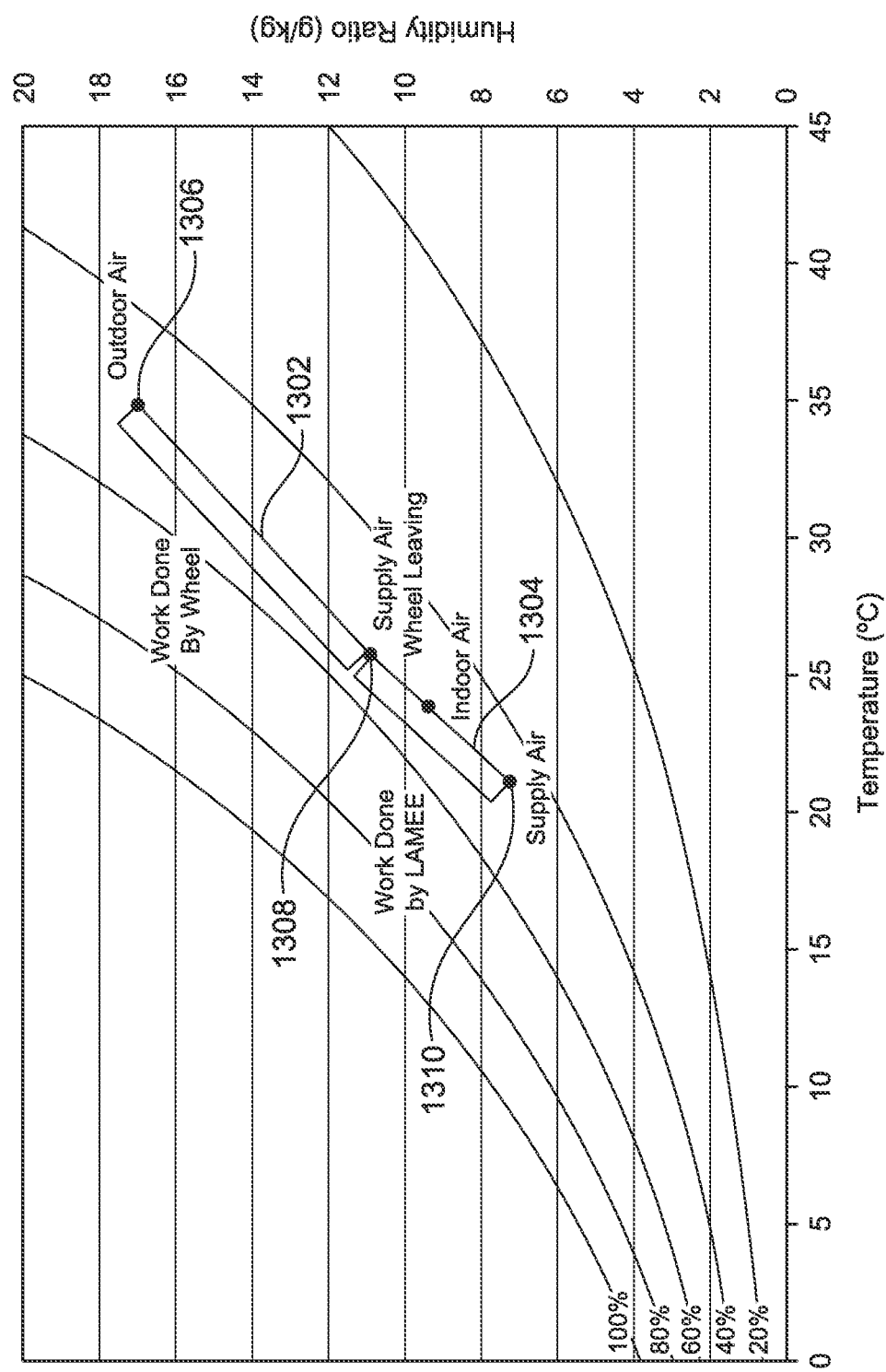
FIG. 13 illustrates a psychometric chart of supply air process lines for an energy exchange system, according to an embodiment.

FIG. 13 illustrates a psychometric chart of supply air process lines for the energy exchange system 100 (summer conditions), shown in FIG. 1, according to an embodiment. As shown by line segment 1302, the energy recovery device 112, such as an enthalpy wheel, performs a substantial amount of work in reducing the temperature and humidity of the outdoor air 1306 that enters the system 100 through the inlet 104 (shown in FIG. 1). Indeed, the energy recovery device 112 performs greater than 50% of the work in reducing the temperature and humidity of the air, as shown by point 1308, which represents the temperature and humidity of the supply air at point B (shown in FIG. 1), for example. Therefore, the work performed by the LAMEE 114, shown by line segment 1304, is substantially reduced. The system 100 efficiently utilizes the supply LAMEE 114, so that the supply LAMEE 114 does not have to bear the entire burden of reducing the temperature and humidity of the outdoor air from point 1306 to point 1310. Instead, the supply LAMEE 114 works to reduce the temperature and humidity of the air from point 1308 to point 1310, while the energy recovery device 112 reduces the temperature and humidity of the air from point 1306 to point 1308. Because the energy recovery device 112 uses substantially less energy than the supply LAMEE 114, the system 100 works in a much more efficient manner than if no energy recovery device were used.

It has been found that the system 100 may achieve combined efficiency (CEF) values that exceed 20, which is significantly higher than conventional energy exchange configurations that typically have CEF values ranging from 12-15. Additionally, it has been found that when the liquid handling device 126 includes a heat pump (such as shown in FIG. 4), the coefficient of performance (COP)/energy efficient ratio (EER) of the heat pump within the system 100 is higher as compared to conventional energy exchange configurations.

Figures 14, 15:
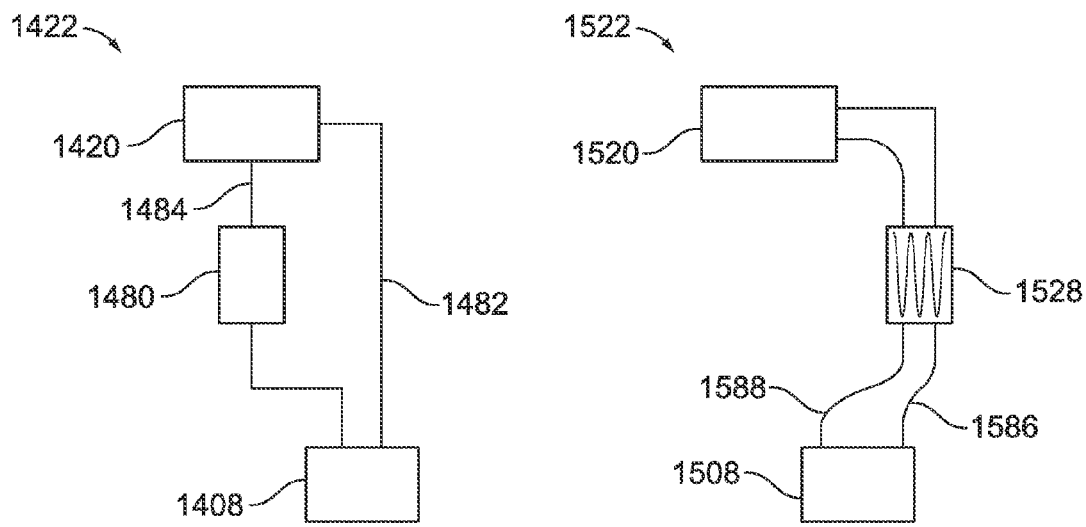
FIG. 14 illustrates a schematic view of a desiccant handling device, according to an embodiment.
FIG. 15 illustrates a schematic view of a desiccant handling device, according to an embodiment.

FIG. 14 illustrates a schematic view of the liquid handling device 1422, according to an embodiment. The liquid handling device 1422 may be a passive system that does not include a heat pump. Instead, the liquid handling device 1422 may include a supply LAMEE 1408 in fluid communication with a desiccant reservoir 1480, which is, in turn, in fluid communication with an exhaust LAMEE 1420. In this embodiment, desiccant flows from the LAMEE 1408 into a desiccant supply line 1482 that directly connects the LAMEE 1408 to the LAMEE 1420. The desiccant passes through the LAMEE 1420 and into a desiccant return line 1484 in which the reservoir 1480 is disposed. The desiccant then passes through the return line 1484 into the supply LAMEE 1408, where the process continues.

FIG. 15 illustrates a schematic view of a liquid handling device 1522, according to an embodiment. In this embodiment, there are no desiccant reservoirs or heat pump. Instead, the desiccant supply line 1586 connects the supply LAMEE 1508 to the exhaust LAMEE 1520, while the desiccant return line 1588 connects the exhaust LAMEE 1520 to the supply LAMEE 1508. The lines 1586 and 1588 meet up at the moisture transfer loop 1528, as shown and described above.

Figure 16:
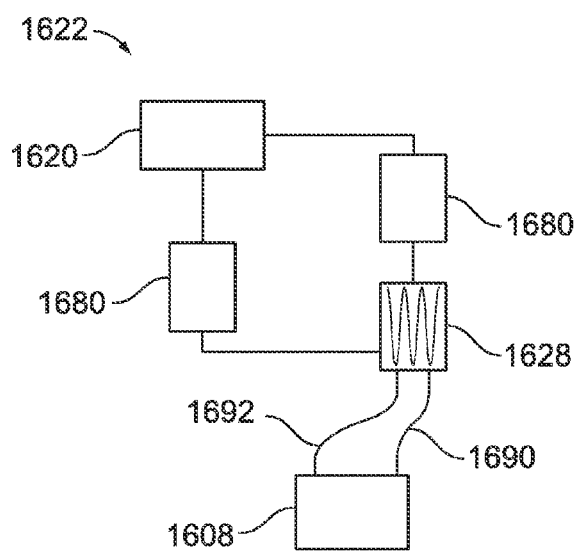
FIG. 16 illustrates a schematic view of a desiccant handling device, according to an embodiment.

FIG. 16 illustrates a schematic view of a liquid handling device 1622, according to an embodiment. In this embodiment, desiccant reservoirs 1680 are disposed in both the desiccant supply line 1690 and return line 1692. Further, the lines meet up at the moisture transfer loop 1628, as shown and described above.

Referring to FIGS. 1 and 14-16, if the system 100 uses additional desiccant storage devices, such as the reservoirs 1480 and 1680 shown in FIGS. 14 and 16, the regenerator may be operated during off hours to regenerate the desiccant. During off-hour operation, the conditioner or heat exchange device provides heating or cooling, depending on demands, to the regenerator loop, for example, through a heat exchanger. In embodiments in which the conditioner includes a compressor and the heat transfer fluid is a refrigerant, a heat exchanger that is external to the system, such as a scavenger coil, may be used to transfer heat with the environment.

Referring again to FIG. 1, the system 100 may include multiple supply air paths 106 and multiple exhaust air paths 122. Multiple paths may merge or funnel into a single flow path that connects to the paths 106 and 122 shown in FIG. 1. Alternatively, additional flow paths may be connected to parallel or serial to the paths shown in FIG. 1.

Figure 17:
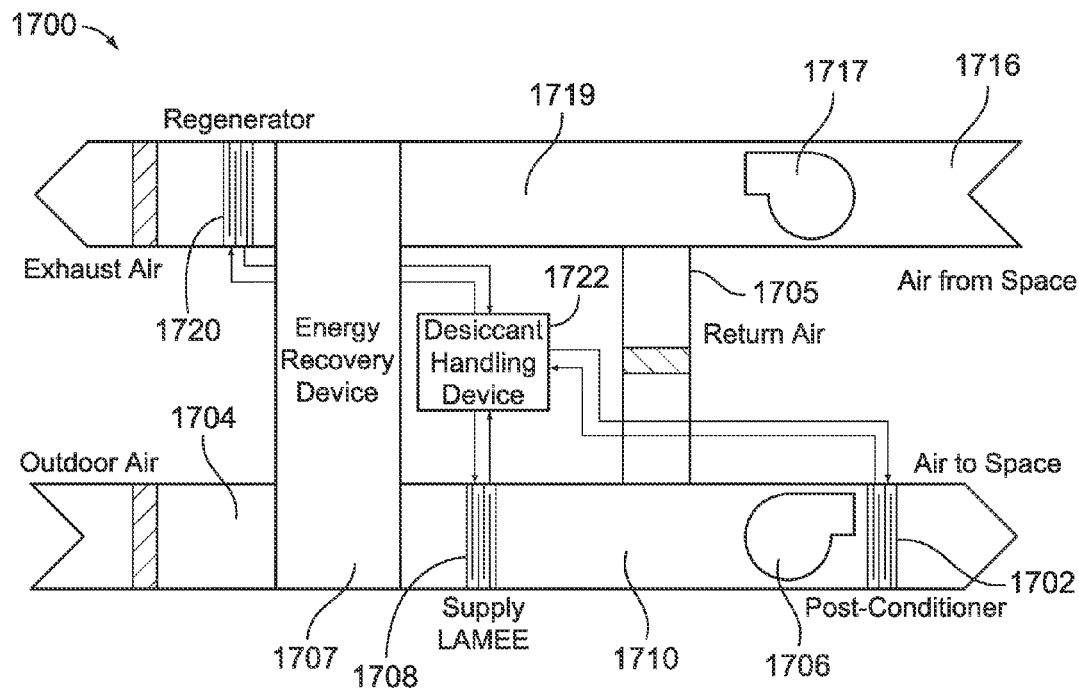
FIG. 17 illustrates a schematic view of an energy exchange system according to an embodiment.

FIG. 17 illustrates a schematic view of an energy exchange system 1700 according to an embodiment. The system 1700 is similar to the system 100, except that the system 1700 includes a post-conditioner 1702 downstream of the supply LAMEE 1708 in the supply flow path 1704. Additionally, a return air duct 1705 connects the exhaust flow path 1719 with the supply flow path 1704. In particular, the return air duct 1704 extends from a point that is upstream from the energy recovery device 1707 in the flow path 1719 to a point that is downstream the supply LAMEE 1708 in the supply path 1704. A portion of the exhaust air that enters the flow path 1719 is shunted into the return air duct 1705 and passes to the post-conditioner 1702 with conditioned supply air. The post-conditioner 1702 then conditions this combined stream of air. Alternatively, the post-conditioner 1702 may be disposed in the air duct 1705. Also, alternatively, the system 1700 may not include the return, air duct 1705.

The post-conditioner 1702 is connected to the liquid handling device 1722 through desiccant supply and return conduits. As such, the liquid handling device 1722 circulates desiccant or another heat transfer fluid to the post-conditioner 1702. Accordingly, the post conditioner 1702 provides supplemental cooling or heating and/or humidification or dehumidification (depending on the time of year and the type of working fluid in the conditioner). In this manner, supply air that enters the supply flow path 1704 at the inlet 1702 is first pre-conditioned by the energy recovery device 1707, then fully conditioned by the supply LAMEE 1708, and then further conditioned by the post-conditioner 1702.

The post-conditioner 1702 may be a heat exchanger, such as a liquid-to-gas coiled heat exchanger, or an energy exchanger, such as a LAMEE. The liquid handling device 1722 circulates either a desiccant or a heat transfer fluid to the post-conditioner 1702. In one embodiment, the liquid handling device 1722 supplies desiccant directly to the post-conditioner 1702 from either a supply loop a regenerator loop.

Figure 18:
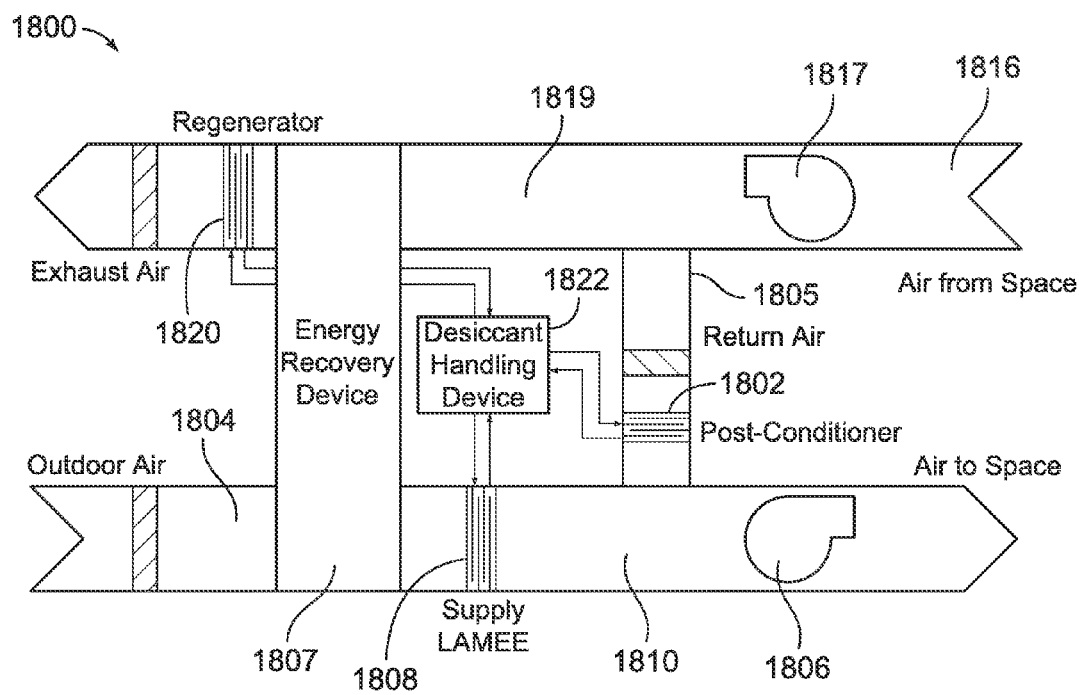
FIG. 18 illustrates a schematic view of an energy exchange system according to an embodiment.

FIG. 18 illustrates a schematic view of an energy exchange system 1800 according to an embodiment. The system 1800 is similar to the system 1700, except that the post conditioner 1802 is disposed within the return air duct 1805. Accordingly, the post conditioner 1802 conditions the shunted exhaust air within the return air duct 1805 before that air comingles with the fully-conditioned supply air within the supply flow path 1804.

Figure 19:
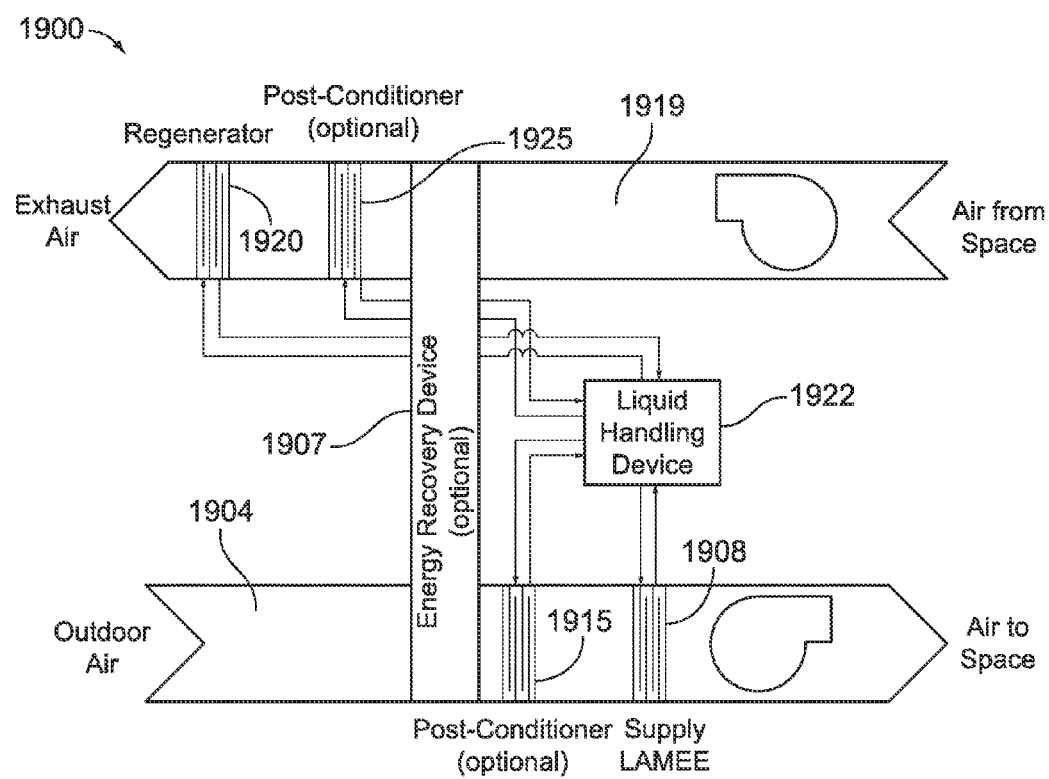
FIG. 19 illustrates a schematic view of an energy exchange system according to an embodiment.

FIG. 19 illustrates a schematic view of an energy exchange system 1900 according to an embodiment. Similar to the system 100, the system 1900 includes a supply flow path 1904. A supply LAMEE 1908 is disposed within the supply flow path 1904. An energy recovery device 1907 may be disposed upstream from the supply LAMEE 1908 in the supply flow path 1904. Additionally, the energy recovery device 1907 may be upstream of a regenerator 1920 in an exhaust flow path 1919. A liquid handling device 1922 is fluidly connected between the supply LAMEE 1908 and regenerator 1920, respectively, as discussed above.

Additionally, a supply post-conditioner 1915 may be positioned downstream from the energy recovery device 1907, but upstream from the supply LAMEE 1908 in the supply flow path 1904. Further, an exhaust post-conditioner 1925 may be positioned downstream from the energy recovery device 1907, but upstream from the regenerator 1920 in the exhaust air flow path 1919. The post-conditioners 1915 and 1925 are fluidly connected by pipes or conduits to the liquid handling device 1922. The post-conditioners 1915 and 1925 provide another level of conditioning that reduces the work load of the supply and exhaust LAMEEs 1908 and 1920. The post-conditioners 1915 and 1925 provide sensible conditioning, but may also be able to provide latent conditioning.

Alternatively, the supply post-conditioner 1915 may be positioned upstream from the energy recovery device 1907. Also, the exhaust post-conditioner 1925 may be positioned upstream from the energy recovery device 1907. The post-conditioners 1915 and 1925 may be fluidly connected to the liquid handling device 1922 in a variety of ways.

Optionally, the system 1900 may not include the energy recovery device 1907. Also, alternatively, the system 1900 may not include the post-conditioners 1915 and/or 1925.

Figure 20:
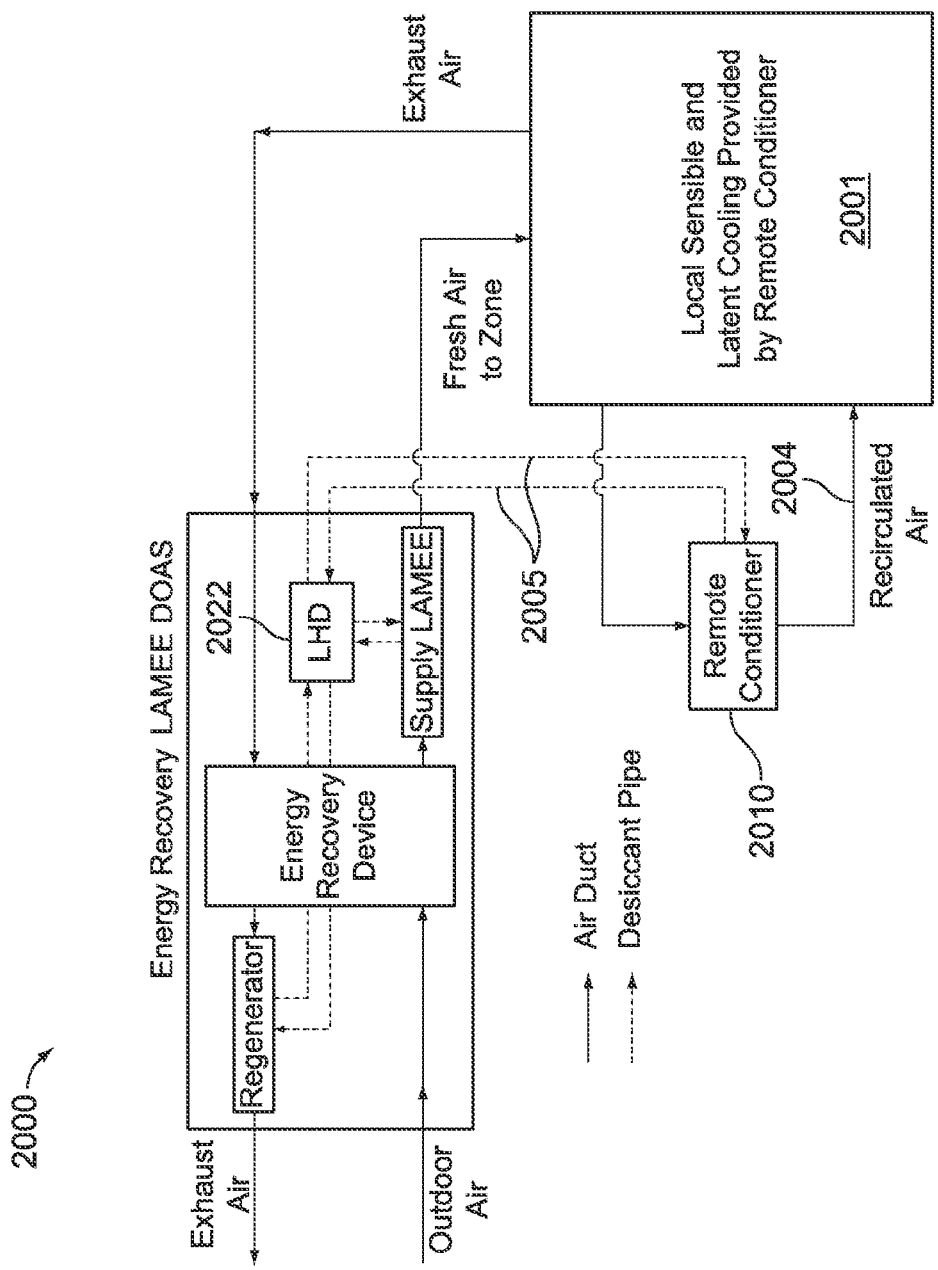
FIG. 20 illustrates a schematic view of an energy exchange system according to an embodiment.

FIG. 20 illustrates a schematic view of an energy exchange system 2000 according to an embodiment. The system 2000 is similar to the system 100, except that an additional conditioner 2010, that is remote from the system 2000, is placed in the recirculation air flow path 2004 that is in fluid communication with the interior space 2001. The remote conditioner 2010, which could be a LAMEE, provides local sensible and latent conditioning directly to the interior space 2001, in addition to the conditioning provided by the system 2000. The remote conditioner 2010 is fluidly connected with the liquid handling device 2022 through pipes or conduits 20005 that transport desiccant solution, refrigerant, water, glycol, or the like.

Figure 21:
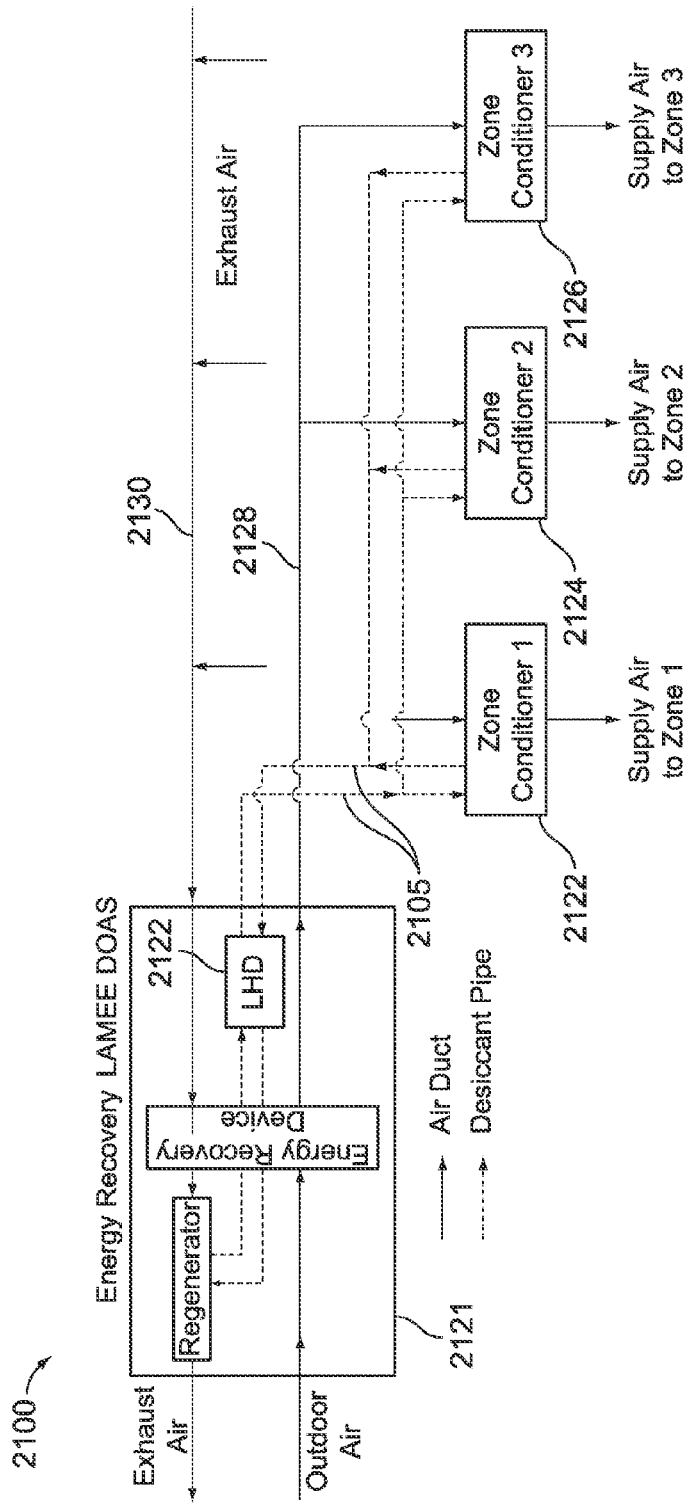
FIG. 21 illustrates a schematic view of an energy exchange system according to an embodiment.

FIG. 21 illustrates a schematic view of an energy exchange system 2100 according to an embodiment. In this embodiment, an energy recovery system 2121, similar to the system 100, provides sensible and latent conditioning to a plurality of zones, each having a separate and distinct zone conditioner 2122, 2124, and 2126, which may be exchangers that can transfer sensible and possibly latent energies, such as a LAMEE or the like. The system 2100 may or may not include a supply LAMEE.

The energy recovery system 2121 is in fluid communication with a supply air line 2128, which, in turn, branches off to each of the zone conditioners 2122, 2124, and 2126. The zone conditioners 2122, 2124, and 2126 are each, in turn, connected to return line 2130 that is in fluid communication with an exhaust flow path of the energy recovery system 2121. Accordingly, the system 2100 is configured to condition air within multiple zones or rooms.

The zone conditioners 2122, 2124, and 2126 are each fluidly connected to the liquid handling device 2122 through pipes or conduits 2105 that transport desiccant solution, refrigerant, water, glycol, or the like.

Figure 22:
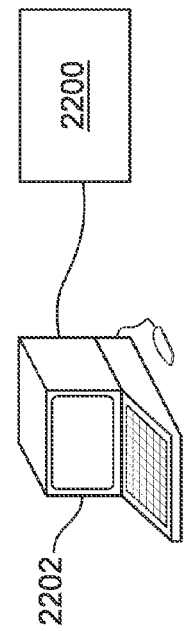
FIG. 22 illustrates a schematic of an energy exchange system according to an embodiment.

FIG. 22 illustrates a schematic of an energy exchange system 2200 according to an embodiment. In this embodiment, a computing device 2202 having a processing unit monitors and controls operation of the energy exchange system 2200, which may be any of the systems 100, 1700, 1800, 1900, 2000, or 2100 discussed above. The computing device 2202 may be used to control the energy recovery device (such as activation and rotation of an enthalpy wheel), the LAMEEs, the moisture control loops, conditioners, heat exchangers, fluid pumps, fluid control valves, and the like.

The computing device 2202 may be remotely located from the system 2200, and may include a portable computer, a PDA, a cell phone, and the like. Optionally, the computing device 2202 may be a thermostat, humidistat, or the like, having a control unit that includes a processing unit. The computing device includes a processing unit, such as a central processing unit (CPU) that may include a microprocessor, a micro-controller, or equivalent control circuitry, designed specifically to control the system 2200. The CPU may include RAM or ROM memory, logic and timing circuitry, state machine circuitry, and I/O circuitry to interface with the system 2200.

The system 2200 may be operated such that the energy recovery device and the LAMEEs are operated simultaneously to provide both desired temperature and humidity to the enclosed space. Optionally, the computing device 2202 may be operated to selectively switch between the energy recovery device and the LAMEEs and/or other components to control either temperature or humidity independent of one another.

As explained above, embodiments provide an energy exchange system that includes one or both of an energy recovery device upstream of a conditioning unit, such as a LAMEE, and/or a liquid handling device that may include a moisture transfer loop.

As explained above, the energy recovery device uses exhaust air to pre-condition the supply air, thereby decreasing the amount of work that a LAMEE, for example, has to do to fully condition the supply air. The LAMEE further contributes to the efficiency of the system because the LAMEE does not over-cool the air during dehumidification. The membrane in the LAMEE separates the air from the desiccant, thereby preventing the transport of the desiccant in the air and resulting damage.

It should be noted that the LAMEEs and energy recovery devices shown and described are exemplary only and various other LAMEEs and recovery devices may be used with respect to the embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An energy exchange system comprising:
a supply air flow path;
an exhaust air flow path;
an energy recovery device disposed within the supply and exhaust air flow paths;
a supply conditioning unit disposed within the supply air flow path, wherein the supply conditioning unit is downstream from the energy recovery device;
a regenerator disposed within the exhaust air flow path; and
a liquid handling device in fluid communication with the supply conditioning unit and the regenerator, wherein the liquid handling device comprises a moisture transfer loop in fluid communication with a supply loop and a regenerator loop.

2. The system of claim 1, wherein the regenerator and at least one heat exchange device are configured to be operated during off-hours to regenerate a desiccant.

3. The system of claim 1, wherein the liquid handling device contains one or more of liquid desiccant, water, glycol.

4. The system of claim 1, wherein the liquid handling device comprises a liquid source, wherein a concentration of liquid within the liquid handling device is configured to be adjusted through the liquid source.

5. The system of claim 1, wherein the liquid handling device comprises:
a first heat exchanger in a supply fluid path;
a second heat exchanger in an exhaust fluid path; and
a conditioner that circulates heat transfer fluid between the first and second heat exchangers.

6. The system of claim 5, further comprising at least one more conditioner downstream or upstream of the first and second heat exchangers.

7. The system of claim 1, wherein the moisture transfer loop comprises a desiccant supply conduit and a desiccant return conduit, wherein at least portions of the desiccant supply conduit and the desiccant return conduit contact one another in a manner that facilitates thermal energy transfer therebetween.

8. The system of claim 7, wherein the desiccant supply conduit is formed concentric within, or concentric to, the desiccant return conduit.

9. The system of claim 7, wherein the desiccant supply conduit is arranged co-radial with the desiccant return conduit with flow occurring in opposite directions through the desiccant supply and return conduits.

10. The system of claim 1, wherein the supply conditioning unit comprises a liquid-to-air membrane energy exchanger (LAMEE).

11. The system of claim 1, further comprising a return air duct that fluidly connects the supply air flow path and the exhaust air flow path, wherein the return air duct connects to the supply air flow path downstream from the supply conditioning unit.

12. The system of claim 11, further comprising at least one post-conditioner disposed in one or both of the supply air flow path or the return air duct.

13. The system of claim 1, further comprising a post-conditioner disposed downstream of the energy recovery device and upstream of the supply conditioning unit in the supply air flow path.

14. The system of claim 1, further comprising a post-conditioner disposed downstream of one or both of the energy recovery device and the regenerator in the exhaust air flow path.

15. The system of claim 1, further comprising a remote conditioner.

16. The system of claim 1, wherein the supply air flow path and the exhaust air flow path are connected to a plurality of zone conditioners.

17. The system of claim 16, wherein the plurality of zone conditioners comprises the supply conditioning unit.

18. The system of claim 1, further comprising at least one control unit that monitors and controls operation of the system.

19. The system of claim 18, wherein the at least one control unit operates the system to selectively control one or both of humidity or temperature.

20. The system of claim 1, wherein each of the moisture transfer loop, the supply loop, and the regenerator loop is formed of one or more conduits that allow desiccant to flow through internal passages.

21. An energy exchange system comprising:
a supply air flow path;
an exhaust air flow path;
a supply conditioning unit disposed within the supply air flow path;
an energy recovery device disposed within the supply and exhaust air flow paths, wherein the supply conditioning unit is downstream from the energy recovery device;
a regenerator disposed within the exhaust air flow path; and
a liquid handling device in fluid communication with the supply conditioning unit and the regenerator, wherein the liquid handling device comprises a moisture transfer loop that is in fluid communication with a supply loop and a regenerator loop.

22. The system of claim 21, wherein the liquid handling device comprises first and second heat exchangers in fluid communication with a first heat exchange fluid conditioner.

23. The system of claim 22, further comprising second and third conditioners.

24. The system of claim 21, wherein the liquid handling device contains one or more of liquid desiccant, water, glycol.

25. The system of claim 21, wherein the liquid handling device comprises a liquid source, wherein a concentration of liquid within the liquid handling device is configured to be adjusted through the liquid source.

26. The system of claim 21, wherein the moisture transfer loop comprises a desiccant supply conduit and a desiccant return conduit, wherein at least portions of the desiccant supply conduit and the desiccant return conduit contact one another in a manner that facilitates thermal energy transfer therebetween.

27. The system of claim 26, wherein the desiccant supply conduit is formed concentric within, or concentric to, the desiccant return conduit.

28. The system of claim 26, wherein the desiccant supply conduit is arranged co-radial with the desiccant return conduit with flow occurring in opposite directions through the desiccant supply and return conduits.

29. The system of claim 21, wherein each of the supply conditioning unit and the regenerator comprises a liquid-to-air membrane energy exchanger (LAMEE).

30. The system of claim 21, further comprising a return air duct that fluidly connects the supply air flow path and the exhaust air flow path, wherein the return air duct connects to the supply air flow path downstream from the supply conditioning unit.

31. The system of claim 30, further comprising at least one post-conditioner disposed in one or both of the supply air flow path or the return air duct.

32. The system of claim 21, further comprising a post-conditioner disposed downstream of the energy recovery device and upstream of the supply conditioning unit in the supply air flow path.

33. The system of claim 21, further comprising a post-conditioner disposed downstream of one or both of the energy recovery device and the regenerator in the exhaust air flow path.

34. The system of claim 21, further comprising a remote conditioner.

35. The system of claim 21, wherein the supply air flow path and the exhaust air flow path are connected to a plurality of zone conditioners.

36. The system of claim 35, wherein the plurality of zone conditioners comprises the supply conditioning unit.

37. The system of claim 21, further comprising at least one control unit that monitors and controls operation of the system.

38. The system of claim 37, wherein the at least one control unit is configured to selectively control one or both of humidity or temperature.

39. The system of claim 21, wherein the regenerator and at least one heat exchange device are configured to be operated during off-hours to regenerate a desiccant circulated within the moisture transfer loop.

40. The system of claim 21, wherein each of the moisture transfer loop, the supply loop, and the regenerator loop is formed of one or more conduits that allow desiccant to flow through internal passages.

41. An energy exchange system comprising:
a supply air flow path;
an exhaust air flow path;
an energy recovery device disposed within the supply and exhaust air flow paths;
a supply liquid-to-air membrane energy exchanger (LAMEE) disposed within the supply air flow path, wherein the supply LAMEE is downstream from the energy recovery device;
an exhaust LAMEE disposed within the exhaust air flow path; and
a liquid handling device in fluid communication with the supply LAMEE and the exhaust LAMEE, wherein the liquid handling device comprises a moisture transfer loop in fluid communication with a supply loop and a regenerator loop.

42. The system of claim 41, wherein the liquid handling device contains one or more of liquid desiccant, water, glycol.

43. The system of claim 41, wherein the liquid handling device comprises a liquid source, wherein a concentration of liquid within the liquid handling device is configured to be adjusted through the liquid source.

44. The system of claim 41, wherein the liquid handling device comprises:
a first heat exchanger in a supply fluid path;
a second heat exchanger in an exhaust fluid path; and
a conditioner that circulates heat transfer fluid between the first and second heat exchangers.

45. The system of claim 44, further comprising at least one more conditioner downstream or upstream of the first and second heat exchangers.

46. The system of claim 41, wherein the moisture transfer loop comprises a desiccant supply conduit and a desiccant return conduit, wherein at least portions of the desiccant supply conduit and the desiccant return conduit contact one another in a manner that facilitates thermal energy transfer therebetween.

47. The system of claim 46, wherein the desiccant supply conduit is formed concentric within, or concentric to, the desiccant return conduit.

48. The system of claim 46, wherein the desiccant supply conduit is arranged co-radial with the desiccant return conduit with flow occurring in opposite directions through the desiccant supply and return conduits.

49. The system of claim 41, further comprising a return air duct that fluidly connects the supply air flow path and the exhaust air flow path, wherein the return air duct connects to the supply air flow path downstream from the supply LAMEE.

50. The system of claim 49, further comprising at least one post-conditioner disposed in one or both of the supply air flow path or the return air duct.

51. The system of claim 41, further comprising a post-conditioner disposed downstream of the energy recovery device and upstream of the supply LAMEE in the supply air flow path.

52. The system of claim 41, further comprising a disposed downstream of one or both of the energy recovery device and the exhaust LAMEE in the exhaust air flow path.

53. The system of claim 52, further comprising a remote conditioner.

54. The system of claim 41, wherein the supply air flow path and the exhaust air flow path are connected to a plurality of zone conditioners.

55. The system of claim 41, further comprising at least one control unit that monitors and controls operation of the system.

56. The system of claim 55, wherein the at least one control unit operates the system to selectively control one or both of humidity or temperature.

57. The system of claim 41, wherein each of the moisture transfer loop, the supply loop, and the regenerator loop is formed of one or more conduits that allow desiccant to flow through internal passages.

58. A method of conditioning air comprising:
introducing outside air as supply air into a supply air flow path;
pre-conditioning the supply air with an energy recovery device;
fully-conditioning the supply air with a supply conditioning unit that is downstream from the energy recovery device;
regenerating desiccant contained within a liquid handling device with a regenerator disposed within the exhaust air flow path; and
circulating the desiccant through a moisture transfer loop that is in fluid communication with a supply loop and a regenerator loop.

59. The method of claim 58, further comprising adjusting a concentration of liquid within the liquid handling device.

60. The method of claim 58, further comprising shunting a portion of the exhaust air from the exhaust air flow path to the supply air flow path through a return air duct.

61. The method of claim 60, further comprising directing the portion of the exhaust air to at least one post-conditioner disposed in one or both of the supply air flow path or the return air duct.

62. The method of claim 58, further comprising monitoring and controlling operation with a control unit.

63. The method of claim 62, further comprising selectively controlling one or both of humidity or temperature with the control unit.

* * * * *